US012633824B2

(12) United States Patent
Jung et al.

(10) Patent No.: US 12,633,824 B2
(45) Date of Patent: May 19, 2026

(54) VOLTAGE CONVERTER AND CHARGING DEVICE FOR LIMITING CHARGING CURRENT

(71) Applicant: Samsung Electronics Co., Ltd., Suwon-si (KR)

(72) Inventors: YoungHo Jung, Suwon-si (KR); Dongsu Kim, Hwaseong-si (KR); Jongbeom Baek, Yangju-si (KR); Nomiyama Takahiro, Seoul (KR); Junsuk Bang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 862 days.

(21) Appl. No.: 17/326,394

(22) Filed: May 21, 2021

(65) Prior Publication Data

US 2021/0376723 A1 Dec. 2, 2021

(30) Foreign Application Priority Data

May 28, 2020 (KR) ........................ 10-2020-0064123

(51) Int. Cl.
H02J 7/00 (2026.01)
H02J 7/90 (2026.01)
(Continued)

(52) U.S. Cl.
CPC ............. H02M 3/155 (2013.01); H02J 7/933 (2026.01); H02M 1/08 (2013.01)

(58) Field of Classification Search
CPC ....... H02M 3/155; H02M 1/08; H02J 7/00712
See application file for complete search history.

(56) References Cited

U.S. PATENT DOCUMENTS 6,426,923 B1 * 7/2002 Minechika ......... H03K 17/6872
360/59
7,957,165 B2 6/2011 Hasegawa et al.
(Continued)

FOREIGN PATENT DOCUMENTS

JP 5868344 B2 2/2016
KR 1020000038281 A 7/2000
(Continued)

OTHER PUBLICATIONS

ElProCus "What is a Feedback Amplifier: Types, Characteristics, and Applications" https://www.elprocus.com/what-is-a-feedback-amplifier-types-characteristics-and-applications/ (2019). (Year: 2019).*
(Continued)

*Primary Examiner* — Drew A Dunn
*Assistant Examiner* — Pamela J Jeppson
(74) *Attorney, Agent, or Firm* — Muir Patent Law, PLLC

(57) ABSTRACT

A voltage converter includes a charging circuit that includes a plurality of switches, and a first capacitor connected to a first node and that outputs an output voltage based on an input voltage, a switch controller that generates a charging switching signal based on the output voltage and a reference voltage, a charging switch that is connected between the first node and a ground node and turn on or turn off in response to a gate voltage, and a gate voltage controller configured to generate the gate voltage based on a voltage of the first node. The maximum level of the gate voltage may be lower than the maximum level of each of the charging switching signal.

15 Claims, 22 Drawing Sheets

(51) Int. Cl.
    *H02M 1/08*         (2006.01)
    *H02M 3/155*       (2006.01)

(56)           References Cited

U.S. PATENT DOCUMENTS

| | | | |
|---|---|---|---|
| 8,598,844 B2 | 12/2013 | Densham et al. | |
| 9,438,131 B2 | 9/2016 | Lee | |
| 2011/0050321 A1* | 3/2011 | Lee | H03K 17/102 |
| | | | 327/404 |
| 2014/0084684 A1 | 3/2014 | Kung | |
| 2016/0072516 A1* | 3/2016 | Shill | G05F 3/262 |
| | | | 341/118 |
| 2017/0126129 A1* | 5/2017 | Li | H02M 1/08 |
| 2017/0237339 A1* | 8/2017 | Young | H02M 1/38 |
| | | | 363/126 |
| 2018/0006559 A1* | 1/2018 | Chen | H02M 7/4833 |
| 2018/0046211 A1* | 2/2018 | Vilas Boas | G05F 1/575 |
| 2019/0310675 A1* | 10/2019 | Araragi | H02M 1/08 |
| 2020/0052500 A1* | 2/2020 | Chen | H02J 7/0013 |
| 2020/0228003 A1 | 7/2020 | Baek et al. | |
| 2020/0302028 A1* | 9/2020 | Natarajan | G06F 30/367 |

FOREIGN PATENT DOCUMENTS

| | | | | | |
|---|---|---|---|---|---|
| KR | 100868803 B1 | 11/2008 | | | |
| KR | 101668641 B1 | 10/2016 | | | |
| KR | 101761034 B1 | 7/2017 | | | |
| KR | 2017115702 A | * | 10/2017 | | G05F 1/461 |
| KR | 1020170115702 A | 10/2017 | | | |
| KR | 1020190080637 A | 7/2019 | | | |
| KR | 102011507 B1 | 8/2019 | | | |
| KR | 1020190090432 A | 8/2019 | | | |
| KR | 1020200051277 A | 5/2020 | | | |
| KR | 1020200108670 A | 9/2020 | | | |

OTHER PUBLICATIONS

Machine translation of KR2017115702A. (Year: 2017).*
Rakesh Panguloori, Charging Super Capacitor With eFuse, Texas Instruments Incorporated, SLVA920—Aug. 2017.

* cited by examiner

FIG. 2

[Buck Mode]

[Buck-Boost Mode #1]

[Buck-Boost Mode #2]

[Boost Mode]

Figure 5:
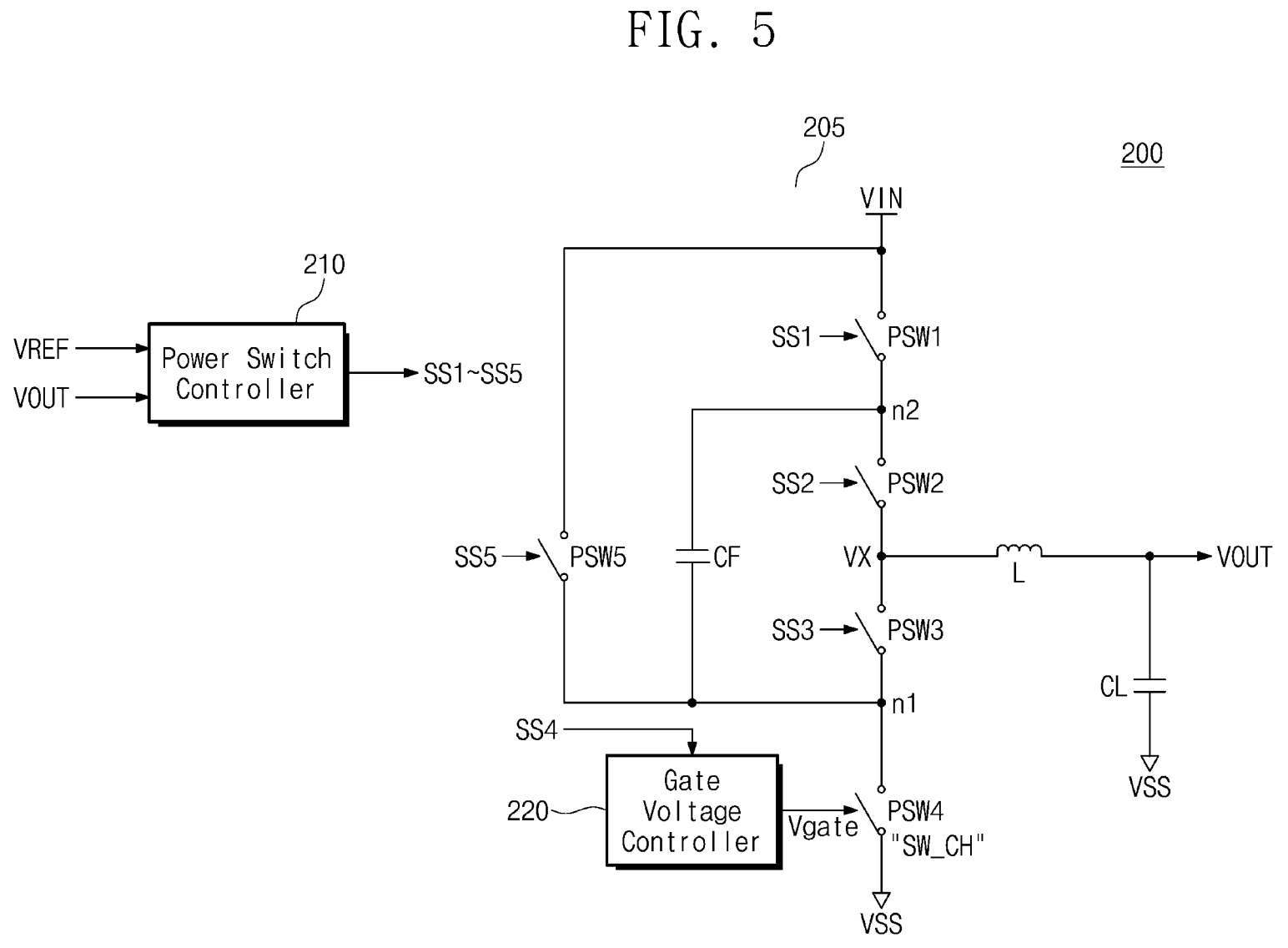

VIN

PSW1

SS1 n2

PSW2

SS2

VX

PSW3

SS3 n1

PSW4

Vgate

"SW_CH"

VSS

CF

PSW5

SS5

Gate Voltage Controller

220

SS4

L

VOUT

CL

VSS

Power Switch Controller

210

SS1~SS5

VREF

VOUT

Figure 21:
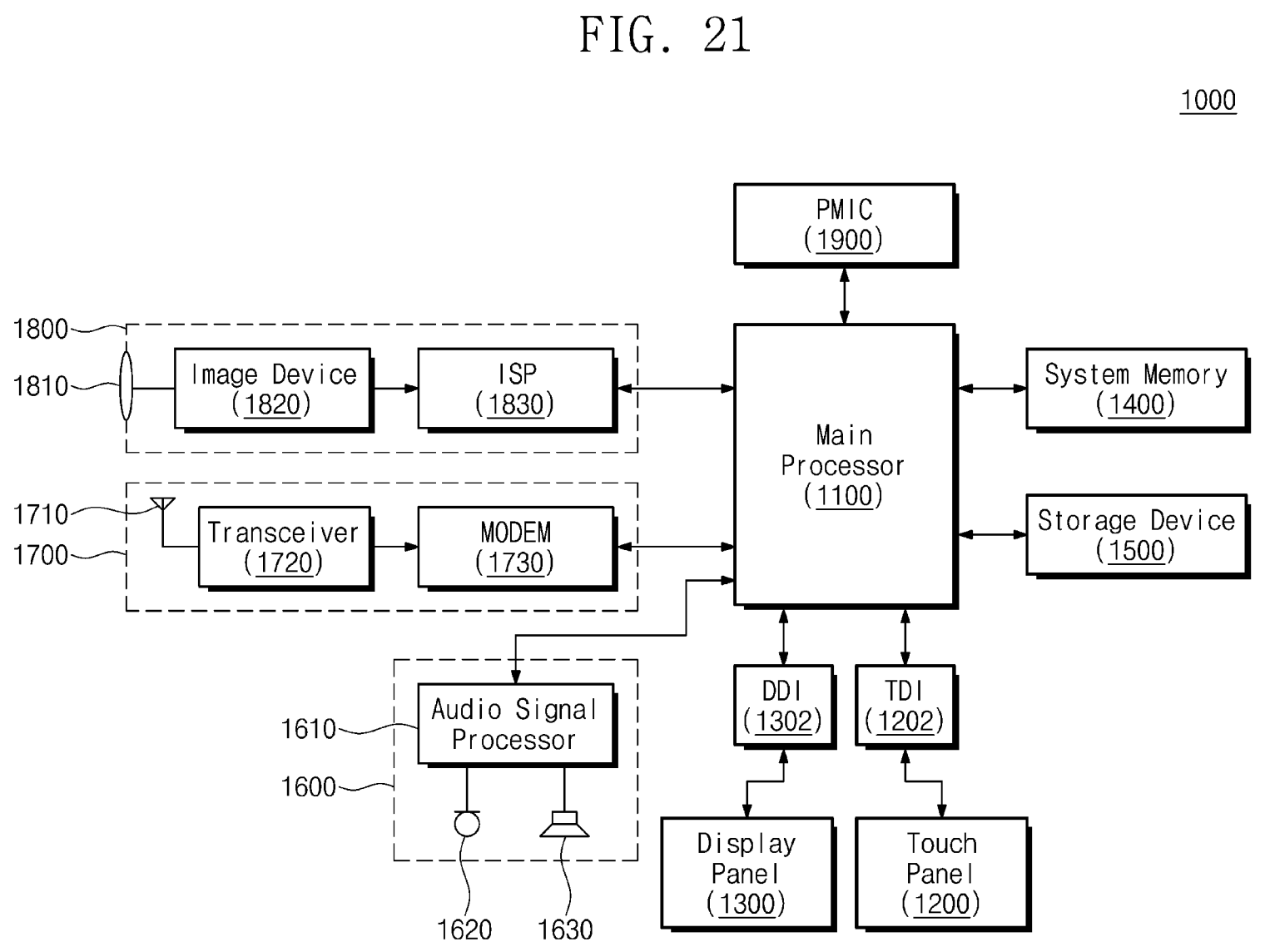

System Memory (1400)

Storage Device (1500)

PMIC (1900)

Main Processor (1100)

TDI (1202)

Touch Panel (1200)

DDI (1302)

Display Panel (1300)

ISP (1830)

Image Device (1820)

1800

1810

MODEM (1730)

Transceiver (1720)

1710

1700

Audio Signal Processor (1600)

1610

1600

1630

1620

VOLTAGE CONVERTER AND CHARGING DEVICE FOR LIMITING CHARGING CURRENT

CROSS-REFERENCE TO RELATED APPLICATIONS

This application claims priority under 35 U.S.C. § 119 to Korean Patent Application No. 10-2020-0064123 filed on May 28, 2020, in the Korean Intellectual Property Office, the disclosure of which is incorporated by reference herein in its entirety.

BACKGROUND

Embodiments of the inventive concept described herein relate to an electronic device, and more particularly, relate to a voltage converter and a charging device for limiting a charging current.

Various electronic devices such as a digital circuit, an analog circuit, and an RF circuit perform various operations by using a uniform power supply voltage. The electronic devices generate a stable power through a way to charge or discharge a capacitor (or a battery) being a passive element. In general, a large charging current is required to charge a capacitor of a large capacity. However, in the case where a charging current becomes large, elements on a current path through which the charging current flows are damaged, or a physical space capable of storing a large charging current is required.

SUMMARY

Embodiments of the inventive concept provide a voltage converter and a charging device for limiting a charging current having improved stability and reliability, by controlling or limiting a magnitude of the charging current of the voltage converter.

According to an exemplary embodiment, a voltage converter includes a charging circuit that includes a plurality of switches, and a first capacitor connected to a first node, and the charging circuit configured to receive an input voltage and output an output voltage based on the input voltage, a switch controller that generates a charging switching signal based on the output voltage and a reference voltage, a charging switch that is connected between the first node and a ground node and configured to receive a gate voltage and turn on or turn off in response to the gate voltage, and a gate voltage controller configured to receive the charging switching signal and generate the gate voltage based on a voltage of the first node. The maximum level of the gate voltage may be lower than the maximum level of the charging switching signal.

According to an exemplary embodiment, a voltage converter includes a first switch that is connected between an input node configured to receive an input voltage and a first node, a second switch that is connected between the first node and an intermediate node, a third switch that is connected between the intermediate node and a second node, a fourth switch that is connected between the second node and a ground node, a fifth switch that is connected between the input node and the second node, a first capacitor that is connected between the first node and the second node, an inductor that is connected between the intermediate node and an output node of outputting an output voltage, a second capacitor that is connected between the output node and the ground node, a switch controller that generates first, second, third, fourth, and fifth switching signals based on a reference voltage and the output voltage, and a gate voltage controller configured to generate a gate voltage based on the fourth switching signal. The first, second, third, and fifth switches are configured to turn on or turn off in response to the first, second, third, and fifth switching signals, respectively, and the fourth switch is configured to turn on or turn off in response to the gate voltage. The maximum level of the gate voltage may be lower than the maximum level of the fourth switching signal.

According to an exemplary embodiment, a charging device includes a charging circuit that includes a first capacitor connected to a first node, a charging switch that is connected between the first node and a ground node and configured to receive a gate voltage and control a charging current flowing through the first capacitor and the charging switch in response to the gate voltage, and a gate voltage controller that generates the gate voltage based on a voltage of the first node. As the voltage of the first node increases, the gate voltage controller decreases the gate voltage.

BRIEF DESCRIPTION OF THE FIGURES

The above and other objects and features of the inventive concept will become apparent by describing in detail exemplary embodiments thereof with reference to the accompanying drawings.

FIG. 2 is a circuit diagram illustrating a voltage converter of FIG. 1 according to example embodiments.

FIG. 5 is a block diagram illustrating a voltage converter according to an embodiment of the inventive concept.

FIG. 10 is a block diagram illustrating a voltage converter according to an embodiment of the inventive concept.

FIG. 12 is a circuit diagram illustrating a VDS tracking circuit and a replica switch of FIG. 11 in detail according to example embodiments.

FIG. 21 is a block diagram illustrating an electronic device according to the inventive concept.

DETAILED DESCRIPTION

Below, exemplary embodiments of the inventive concept are described with reference to the accompanying drawings.

Figure 1:
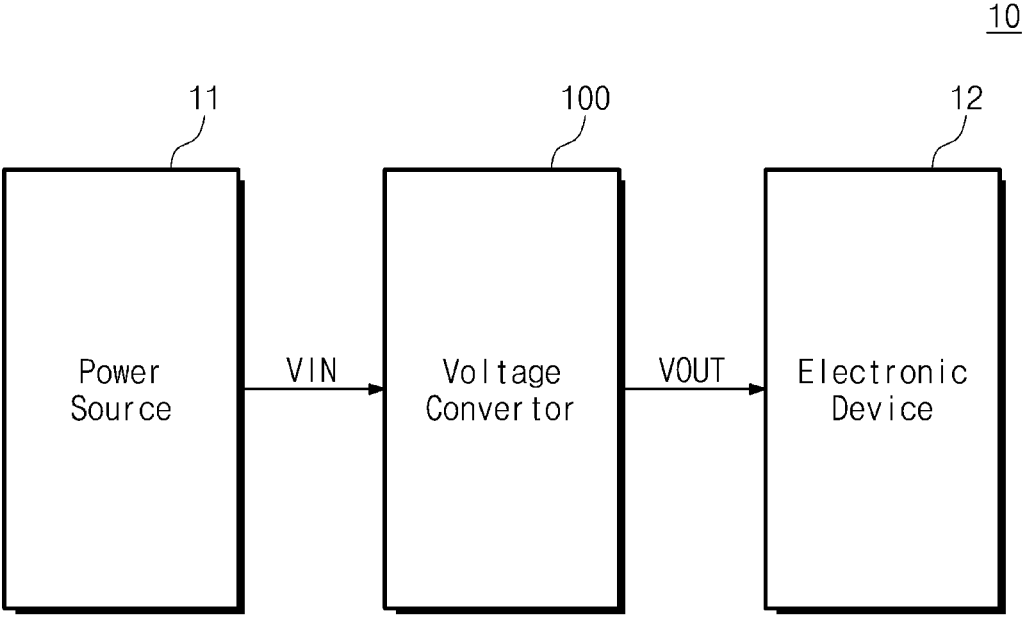
FIG. 1 is a block diagram illustrating an electronic system according to an embodiment of the inventive concept.

FIG. 1 is a block diagram illustrating an electronic system according to an embodiment of the inventive concept. Referring to FIG. 1, an electronic system 10 may include a power source 11, a voltage converter 100, and an electronic device 12. The electronic system 10 or the electronic device 12 may be at least one of various information processing systems or devices such as a portable communication terminal, a personal digital assistant (PDA), a portable media player (PMP), a digital camera, a smartphone, a tablet computer, a laptop computer, and a wearable device. In an exemplary embodiment, the electronic device 12 may be a device or a functional block (e.g., an intellectual property (IP) block), which is configured to perform various operations by using a power supply voltage, such as a processor, an application processor, a wireless circuit, a digital circuit, and an analog circuit.

The power source 11 may be configured to supply a power to the electronic system 10 or the electronic device 12. In an exemplary embodiment, the power source 11 may be a portable power supply device such as a battery, but the inventive concept is not limited thereto.

The voltage converter 100 may receive an input voltage VIN from the power source 11 and may output an output voltage VOUT based on the received input voltage VIN. The output voltage VOUT may be provided to the electronic device 12, and the electronic device 12 may perform various operations by using the output voltage VOUT.

The voltage converter 100 may perform a voltage conversion operation (or DC-to-DC conversion) on the input voltage VIN to generate the output voltage VOUT. In an exemplary embodiment, the voltage converter 100 may be a DC voltage converter, that is, a DC-to-DC converter, but the inventive concept is not limited thereto.

For example, a level of the input voltage VIN may vary depending on states of the power source 11. In detail, in the case where the power source 11 is a battery, as the power source 11 changes from a fully charged state to a discharge state, the level of the input voltage VIN may decrease as a time elapses. For example, when the power source 11 is fully charged, a level of the input voltage VIN may be a power supply voltage VDD, and when the power source 11 is fully discharged, a level of the input voltage VIN may be a ground VSS. The output voltage VOUT of a uniform level may be required to perform a stable operation of the electronic device 12. The voltage converter 100 may generate the output voltage VOUT of a uniform level by performing the voltage conversion operation on the input voltage VIN that varies.

As will be more fully described below, the voltage converter 100 according to an embodiment of the inventive concept may include a capacitor having a relatively large capacitance. The voltage converter 100 may perform the above voltage conversion operation through the charging and discharging of the capacitor. In an exemplary embodiment, the voltage converter 100 according to an embodiment of the inventive concept may include a gate voltage controller configured to control a charging current for the capacitor. According to an embodiment of the inventive concept, a magnitude, a maximum level, or a peak level of the charging current for the capacitor may be regulated or limited by an operation of the gate voltage controller. The voltage converter 100 or the gate voltage controller according to an embodiment of the inventive concept will be described with reference to drawings below.

Figure 2:
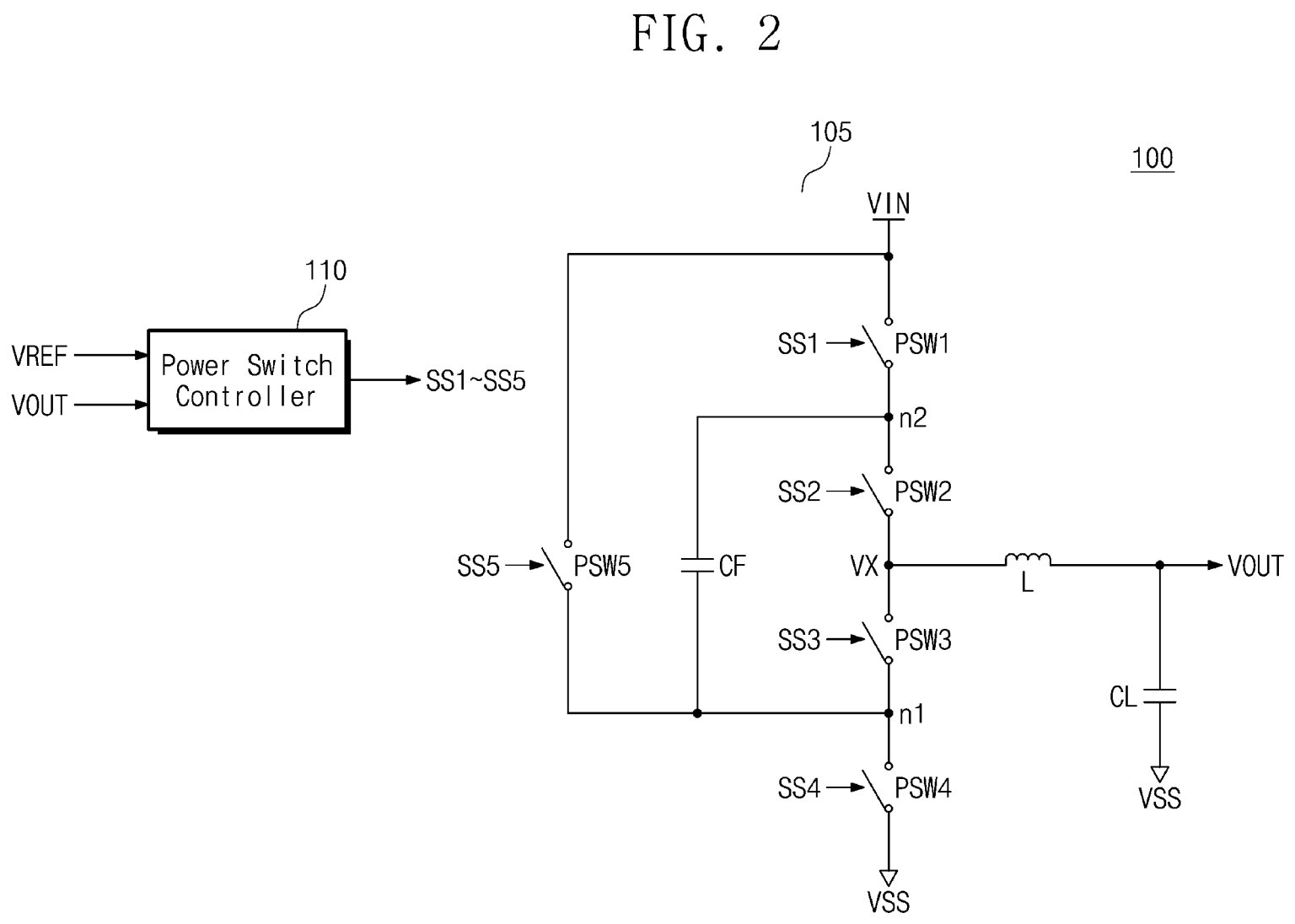

FIG. 2 is a circuit diagram illustrating a voltage converter of FIG. 1 according to example embodiments. An exemplary configuration of the voltage converter 100 will be described with reference to FIG. 2, but the inventive concept is not limited thereto. For example, it may be understood that the configuration of voltage converter 100 is variously changed or modified. Below, for brevity of illustration and convenience of description, some reference signs are used as various meanings. For example, a reference sign (e.g., VX) indicating a voltage of a specific node may be used to designate the specific node itself. That is, reference sign "VX" may designate an intermediate node or may designate a voltage of the intermediate node. However, the inventive concept is not limited thereto. For example, respective reference signs should be interpreted depending on the context of embodiments.

Referring to FIGS. 1 and 2, the voltage converter 100 may perform a voltage conversion operation on the input voltage VIN and may generate the output voltage VOUT as a result of the voltage conversion operation. The voltage converter 100 may include a charging circuit 105 and a power switch controller 110. For example, the charging circuit 105 may include first to fifth power switches PSW1 to PSW5, a flying capacitor CF, an inductor "L", and a load capacitor CL.

Each of the first to fifth power switches PSW1 to PSW5 may be a power metal-oxide-semiconductor field-effect transistor (MOSFET). Each of the first to fifth power switches PSW1 to PSW5 may have N-type transistor or P-type transistor depending on a way to implement. For example, the first and second power switches PSW1 and PSW2 may be a P-type power MOSFET, and the third, fourth, and fifth power switches PSW3, PSW4, and PSW5 may be an N-type power MOSFET. However, the inventive concept is not limited thereto.

The first power switch PSW1 may be connected between an input node VIN and a second node n2 and may operate (i.e., turn on or turn off) in response to a first switching signal SS1. The second power switch PSW2 may be connected between the second node n2 and an intermediate node VX and may operate in response to a second switching signal SS2. The third power switch PSW3 may be connected between the intermediate node VX and a first node n1 and may operate in response to a third switching signal SS3. The fourth power switch PSW4 may be connected between the first node n1 and a ground node (or, the ground) VSS and may operate in response to a fourth switching signal SS4. The fifth power switch PSW5 may be connected between the input node VIN and the first node n1 and may operate in response to a fifth switching signal SS5. The flying capacitor CF may be connected between the first node n1 and the second node n2. The inductor "L" may be connected between the intermediate node VX and an output node VOUT. The load capacitor CL may be connected between the output node VOUT and the ground node VSS.

The power switch controller 110 may generate the first to fifth switching signals SS1 to SS5, based on a reference voltage VREF and the output voltage VOUT. For example, the reference voltage VREF may be a predetermined voltage. For example, the power switch controller 110 may compare the output voltage VOUT with the reference voltage VREF and may determine an operating mode (e.g., a buck mode, a buck-boost mode, or a boost mode) of the voltage converter 100 based on the comparison result. The power switch controller 110 may generate the first to fifth switching signals SS1 to SS5 based on the determined operating mode.

Figure 3A:
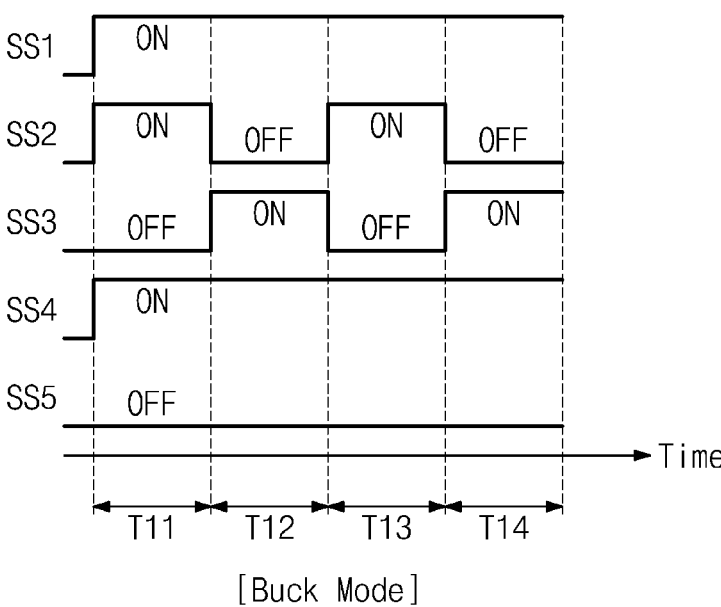
FIGS. 3A to 3D are timing diagrams illustrating first to fifth switching signals according to an operating mode of a voltage converter of FIG. 2 according to example embodiments.

FIGS. 3A to 3D are timing diagrams illustrating first to fifth switching signals according to an operating mode of a voltage converter of FIG. 2 according to example embodiments. FIGS. 4A to 4C are diagram illustrating current paths formed at a voltage converter depending on timing diagrams of FIGS. 3A to 3D according to example embodiments.

For brevity of illustration and convenience of description, it is assumed that the first to fifth power switches PSW1 to PSW5 are turned on in response to a switching signal of an on-voltage ON and are turned off in response to a switching signal of an off-voltage OFF, the on-voltage ON corresponds to a high level, and the off-voltage OFF corresponds to a low level. However, the inventive concept is not limited thereto. For example, levels of the on-voltage ON and the off-voltage OFF may be switched depending on a type (e.g., N-type or P-type) of each of the first to fifth power switches PSW1 to PSW5.

For brevity of illustration and convenience of description, in drawings of FIGS. 4A to 4C, signs of the first to fifth power switches PSW1 to PSW5 are omitted, and only current paths according to turn-on and turn-off states of the first to fifth power switches PSW1 to PSW5 are illustrated.

Referring to FIGS. 2, 3A to 3D, and 4A to 4C, the voltage converter 100 may operate in one of various operating modes, for example, in the buck mode, the buck-boost mode, or the boost mode. The buck mode may indicate a mode in which the output voltage VOUT is generated by stepping down the input voltage VIN, the buck-boost mode may indicate a mode in which the output voltage VOUT is generated by stepping up or stepping down the input voltage VIN, and the boost mode may indicate a mode in which the output voltage VOUT is generated by stepping up the input voltage VIN.

In example embodiments, the voltage converter 100 which operates in the buck mode, the buck-boost mode, and the boost mode may be a buck-type DC voltage converter, a buck-boost-type DC voltage converter a boost-type DC voltage converter, respectively.

In the case where the output voltage VOUT is greater than the reference voltage VREF and a difference between the output voltage VOUT and the reference voltage VREF is equal to or greater than a threshold value, the voltage converter 100 may operate in the buck mode. In the case where the voltage converter 100 operates in the buck mode, the output voltage VOUT may be provided by stepping down the input voltage VIN. For example, as illustrated in FIG. 3A, in a period T11, the power switch controller 110 may generate the switching signals SS1 to SS5 such that the first, second, and fourth switching signals SS1, SS2, and SS4 have the on-voltage ON and the third and fifth switching signals SS3 and SS5 have the off-voltage OFF. For example, the on-voltage ON may be the power supply voltage VDD and the off-voltage OFF may be the ground VSS.

By the first to fifth switching signals SS1 to SS5 in the period T11, the first, second, and fourth power switches PSW1, PSW2, and PSW4 may be turned on, and the third and fifth power switches PSW3 and PSW5 may be turned off. In this case, the voltage converter 100 may be expressed by an equivalent circuit illustrated in FIG. 4A. As illustrated in FIG. 4A, a first current path PATH1 in which a current flows from the input node VIN to the ground node VSS through the second node n2, the flying capacitor CF, and the first node n1 may be formed, and a second current path PATH2 in which a current flows from the input node VIN to the output node VOUT through the inductor "L" may be formed.

Next, in a period T12, the power switch controller 110 may change the second switching signal SS2 to the off-voltage OFF and may change the third switching signal SS3 to the on-voltage ON. The remaining switching signals may remain at the previous states (i.e., ON or OFF). By the first to fifth switching signals SS1 to SS5 in the period T12, the first, third, and fourth power switches PSW1, PSW3, and PSW4 may be turned on, and the second and fifth power switches PSW2 and PSW5 may be turned off. In this case, the voltage converter 100 may be expressed by an equivalent circuit illustrated in FIG. 4B. As illustrated in FIG. 4B, a third current path PATH3 in which a current flows from the input node VIN to the ground node VSS through the second node n2, the flying capacitor CF, and the first node n1 may be formed, and a fourth current path PATH4 in which a current flows from the first node n1 to the output node VOUT through the inductor "L" may be formed.

Afterwards, the power switch controller 110 may generate the first to fifth switching signals SS1 to SS5 in each of periods T13 and T14. The periods T13 and T14 are similar to the periods T11 and T12, respectively, and thus, additional description will be omitted to avoid redundancy.

As described above, in the case where the voltage converter 100 operates in the buck mode, as the current paths PATH1, PATH2, PATH3, and PATH4 illustrated in the equivalent circuits of FIGS. 4A and 4B are repeatedly formed, the input voltage VIN may be stepped down. As such, the output voltage VOUT, the level of which is lower than that of the input voltage VIN, may be output.

In the case where the difference between the output voltage VOUT and the reference voltage VREF is smaller than the threshold value, the voltage converter 100 may operate in a first buck-boost mode Buck-Boost Mode #1 or a second buck-boost mode Buck-Boost Mode #2. In the case where the voltage converter 100 operates in the first buck-boost mode Buck-Boost Mode #1 or the second buck-boost mode Buck-Boost Mode #2, the output voltage VOUT of a uniform level may be provided by stepping up or stepping down the input voltage VIN.

Figure 3B:
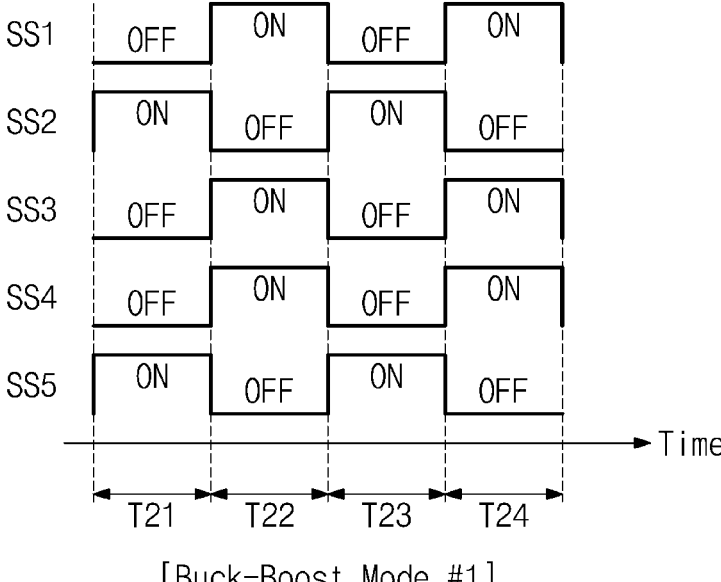
Figure 4A:
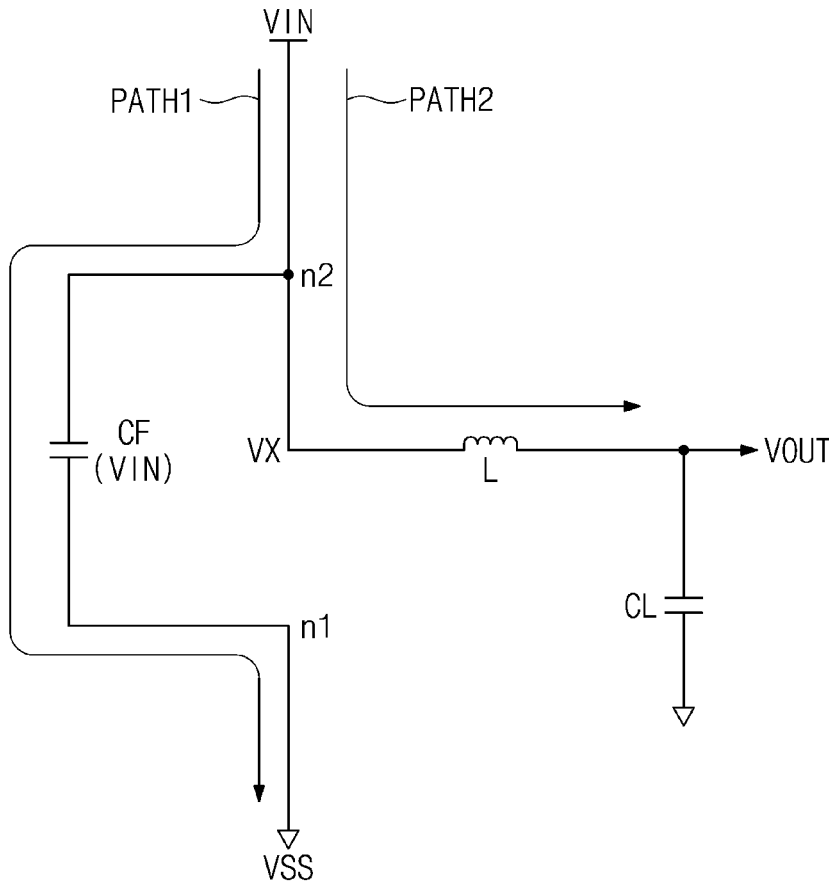
FIGS. 4A to 4C are diagrams illustrating current paths formed at a voltage converter depending on timing diagrams of FIG. 3A to FIG. 3D according to example embodiments.
Figure 4B:
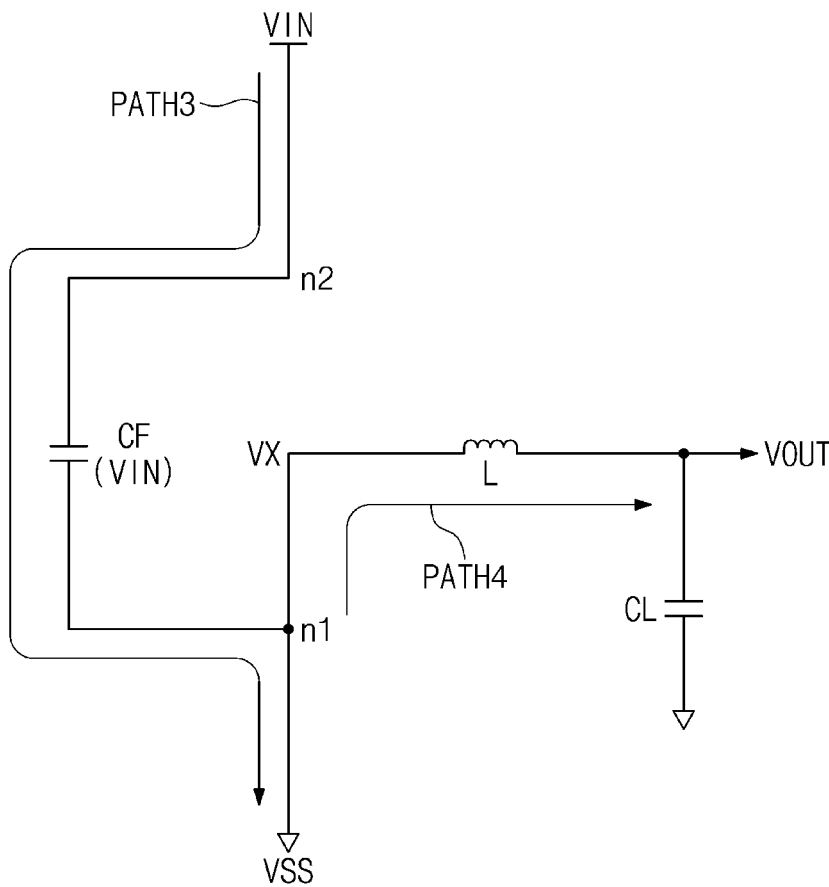
Figure 4C:
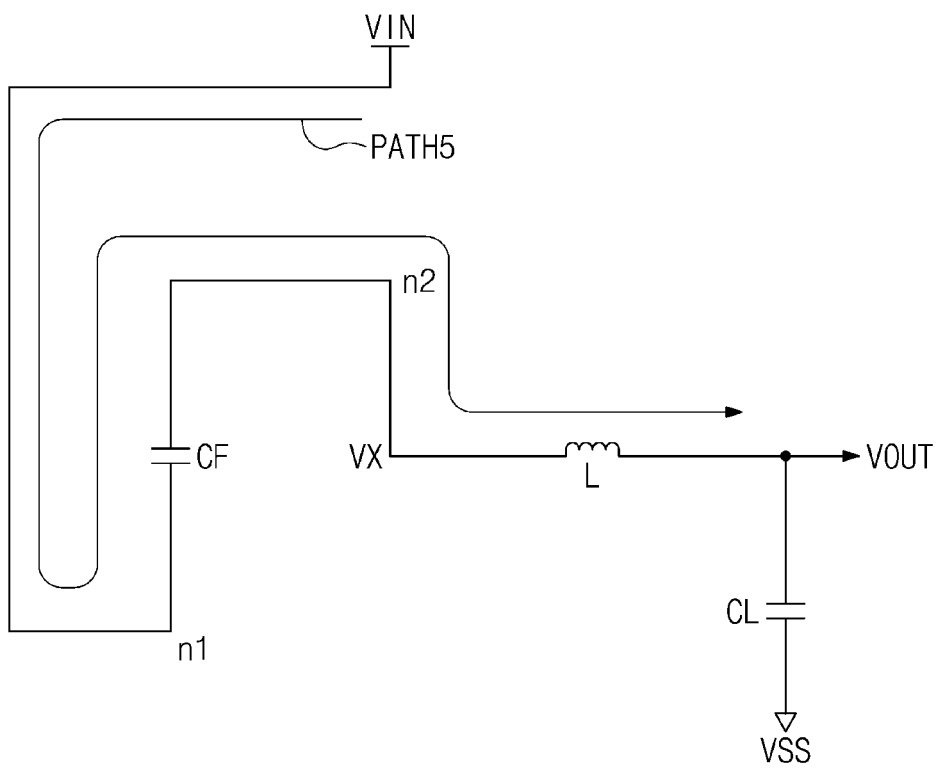

For example, in the case where the voltage converter 100 operates in the first buck-boost mode Buck-Boost Mode #1, as illustrated in FIG. 3B, in a period T21, the power switch controller 110 may generate the switching signals SS1 to SS5 such that the second and fifth switching signals SS2 and SS5 have the on-voltage ON and the first, third, and fourth switching signals SS1, SS3, and SS4 have the off-voltage OFF.

By the first to fifth switching signals SS1 to SS5 in the period T21, the second and fifth power switches PSW2 and PSW5 may be turned on, and the first, third, and fourth power switches PSW1, PSW3, and PSW4 may be turned off. In this case, the voltage converter 100 may be expressed by an equivalent circuit illustrated in FIG. 4C. As illustrated in FIG. 4C, a fifth current path PATH5 in which a current flows from the input node VIN to the ground node VSS through the flying capacitor CF, the second node n2, the inductor "L", and the load capacitor CL may be formed.

Next, in each of periods T22, T23, and T24, the power switch controller 110 may control the first to fifth switching signals SS1 to SS5. The period T23 is identical to the period T21, and thus, additional description will be omitted to avoid redundancy. Each of the periods T22 and T24 is identical to the period T12 of FIG. 3A, and thus, additional description will be omitted to avoid redundancy. For example, in each of the periods T22 and T24, the voltage converter 100 may be in the form of the equivalent circuit illustrated in FIG. 4B.

As described above, in the case where the voltage converter 100 operates in the first buck-boost mode Buck-Boost Mode #1, as the current paths PATH3, PATH4, and PATH5 illustrated in the equivalent circuits of FIGS. 4B and 4C are repeatedly formed, the output voltage VOUT of a uniform level may be provided regardless of a change in the input voltage VIN.

Figure 3C:
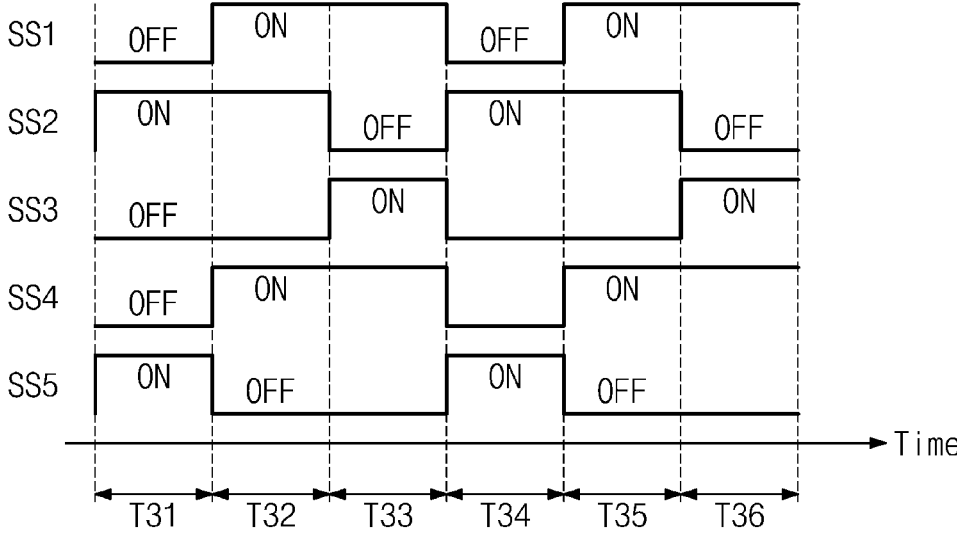

In the case where the voltage converter 100 operates in the second buck-boost mode Buck-Boost Mode #2, as illustrated in FIG. 3C, in each of periods T31, T32, T33, T34, T35, and T36, the power switch controller 110 may control the first to fifth switching signals SS1 to SS5. Each of the periods T31 and T34 is identical to the period T21 of FIG. 3B, each of the periods T32 and T35 is identical to the period T11 of FIG. 3A, and each of the periods T33 and T36 is identical to the period T22 of FIG. 3B. Thus, additional description will be omitted to avoid redundancy. For example, in the periods T31 and T34, the voltage converter 100 may be in the form of the equivalent circuit of FIG. 4C; in the periods T32 and T35, the voltage converter 100 may be in the form of the equivalent circuit of FIG. 4A; and, in the periods T33 and T36, the voltage converter 100 may be in the form of the equivalent circuit of FIG. 4B.

As described above, in the case where the voltage converter 100 operates in the second buck-boost mode Buck-Boost Mode #2, as the current paths PATH1, PATH2, PATH3, PATH4, and PATH5 illustrated in the equivalent circuits of FIGS. 4A to 4C are repeatedly formed, the output voltage VOUT of a uniform level may be output regardless of a change in the input voltage VIN.

In the case where the output voltage VOUT is smaller than the reference voltage VREF and a difference between the output voltage VOUT and the reference voltage VREF is equal to or greater than the threshold value, the voltage converter 100 may operate in the boost mode. In the case where the voltage converter 100 operates in the boost mode, the output voltage VOUT of a uniform level may be provided by stepping up the input voltage VIN.

Figure 3D:
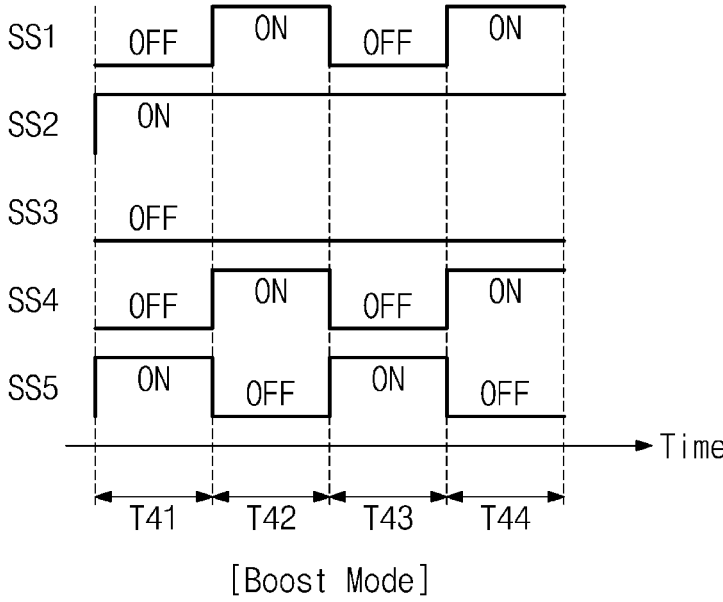

For example, as illustrated in FIG. 3D, in each of periods T41, T42, T43, and T44, the power switch controller 110 may control the first to fifth switching signals SS1 to SS5. Each of the periods T41 and T43 is identical to the period T21 of FIG. 3B, and each of the periods T42 and T44 is identical to the period T11 of FIG. 3A. Thus, additional description will be omitted to avoid redundancy. For example, in the periods T41 and T43, the voltage converter 100 may be in the form of the equivalent circuit of FIG. 4C; in the periods T42 and T44, the voltage converter 100 may be in the form of the equivalent circuit of FIG. 4A.

As described above, in the case where the voltage converter 100 operates in the boost mode, as the current paths PATH1, PATH2, and PATH5 illustrated in the equivalent circuits of FIGS. 4A and 4C are repeatedly formed, the output voltage VOUT of a uniform level greater than that of the input voltage VIN may be provided.

As described above, the voltage converter 100 may operate in one of various operating modes based on the input voltage VIN and the reference voltage VREF, thus generating the output voltage VOUT of a uniform level. In an exemplary embodiment, the above voltage conversion operation may be accomplished by the charging and discharging of the flying capacitor CF included in the voltage converter 100.

For example, the first current path PATH1 of the equivalent circuit in FIG. 4A or the third current path PATH3 of the equivalent circuit in FIG. 4B may be a current path in which a charging current for charging the flying capacitor CF flows. In this case, under a specific condition (e.g., an initial operation or a condition that a load associated with the electronic device 12 varies), a magnitude of a current (or an amount of current) for charging the flying capacitor CF may increase, and the increased charging current may cause a damage of the voltage converter 100 or the electronic system 10 in which the voltage converter 100 is included. Accordingly, a device for controlling or limiting a charging current used to charge the flying capacitor CF (or a capacitor of a relatively large capacitance) may be needed.

FIG. 5 is a block diagram illustrating a voltage converter according to an embodiment of the inventive concept. Referring to FIG. 5, a voltage converter 200 may perform a voltage conversion operation on the input voltage VIN to output the output voltage VOUT of a uniform level. The voltage converter 200 may include a charging circuit 205, a power switch controller 210, and a gate voltage controller 220. For example, the charging circuit 205 may include the first to fifth power switches PSW1 to PSW5, the flying capacitor CF, the inductor "L", and the load capacitor CL.

The power switch controller 210 may output the first to fifth switching signals SS1 to SS5 based on the reference voltage VREF and the output voltage VOUT, and the first to fifth power switches PSW1 to PSW5 may operate in response to the first to fifth switching signals SS1 to SS5, respectively. The first to fifth power switches PSW1 to PSW5, the flying capacitor CF, the inductor "L", the load capacitor CL, and the power switch controller 210 are similar to those described with reference to FIG. 2, and thus, additional description will be omitted to avoid redundancy.

In an exemplary embodiment, a charging current used to charge the flying capacitor CF may flow through the first and third current paths PATH1 and PATH3 as illustrated in FIGS. 4A and 4B. The first and third current paths PATH1 and PATH3 may pass through the fourth power switch PSW4 connected between the flying capacitor CF and the ground node VSS. That is, the charging current used to charge the flying capacitor CF may flow through the fourth power switch PSW4.

The gate voltage controller 220 may regulate or limit a magnitude of the charging current by controlling a level of a gate voltage Vgate that is provided to a gate of the fourth power switch PSW4. In this case, the fourth power switch PSW4 may be an N-type transistor. For example, the plurality of switching signals SS1 to SS5 may be generated based on the power supply voltage VDD or the input voltage VIN. For example, the maximum level or a peak level of each of the plurality of switching signals SS1 to SS5 may be equal to the power supply voltage VDD or the input voltage VIN. In contrast, the gate voltage Vgate may have the same period (or the same ON or OFF state) as the fourth switching signal SS4, but the maximum magnitude or a peak level of the gate voltage Vgate may be smaller than the maximum magnitude or a peak level of the fourth switching signal SS4 (or the plurality of switching signals SS1 to SS4). For example, a magnitude of the charging current flowing through the fourth power switch PSW4 may be regulated or limited by decreasing a level of the gate voltage Vgate applied to the gate of the fourth power switch PSW4. A configuration and an operation of the gate voltage controller 220 will be described with reference to drawings below.

Below, to describe the technical idea of the inventive concept easily, the fourth power switch PSW4 connected between the flying capacitor CF and the ground node VSS is called a "charging switch SW_CH". That is, the charging switch SW_CH may be connected between the flying capacitor CF and the ground node VSS. The charging switch SW_CH may be a switch placed on a path through which the charging current used to charge the flying capacitor CF flows, or may be a switch regulating or limiting a magnitude of the charging current. The gate voltage Vgate applied to the gate of the charging switch SW_CH may be controlled by the gate voltage controller 220.

Figure 6:
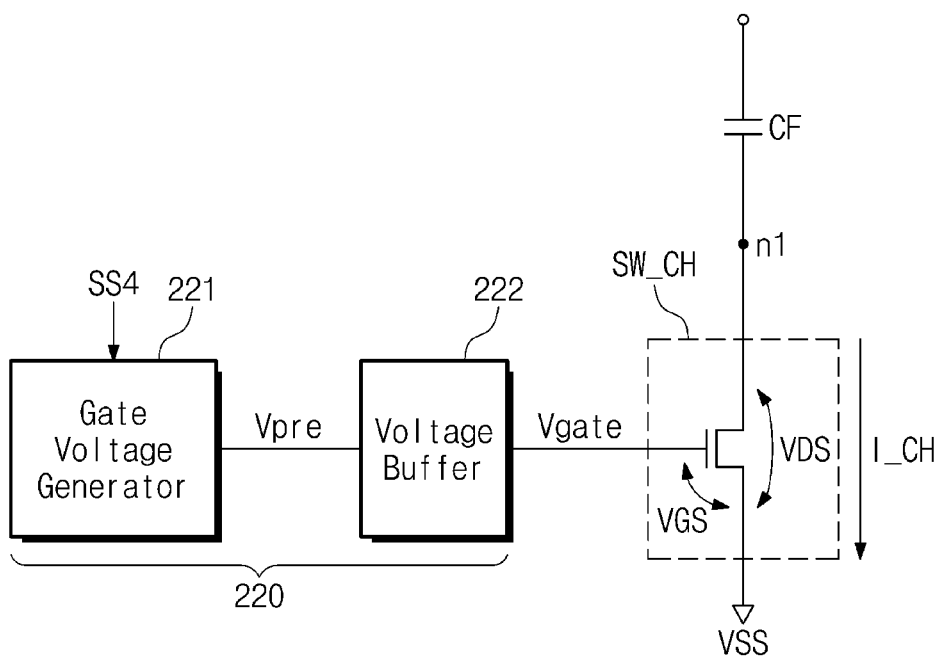
FIG. 6 is a diagram illustrating a gate voltage controller of FIG. 5 according to example embodiments.
Figure 7:
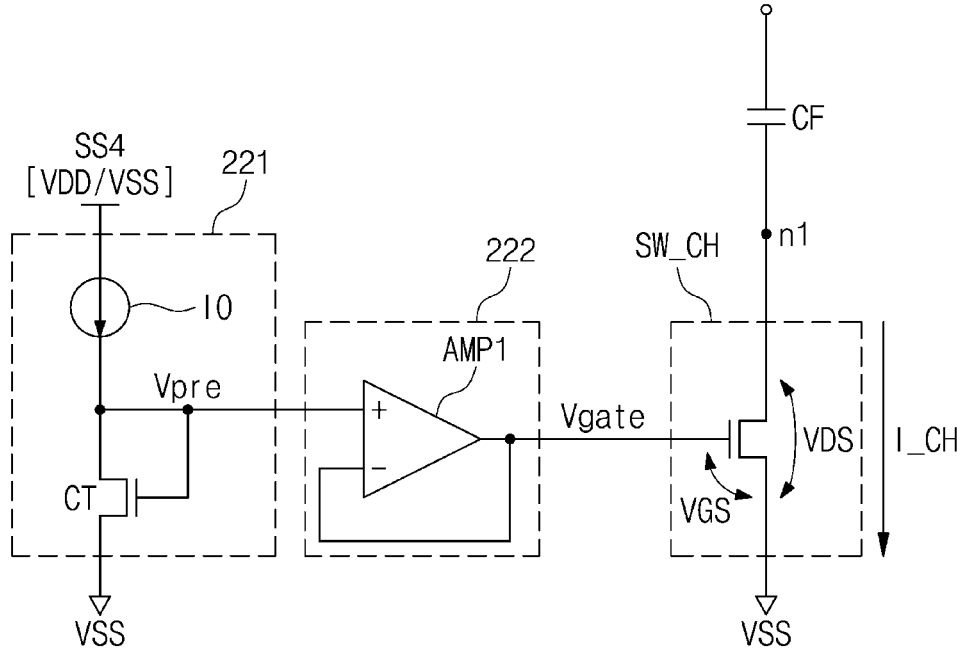
FIG. 7 is a circuit diagram illustrating a gate voltage generator and a voltage buffer of FIG. 6 according to example embodiments.

FIG. 6 is a diagram illustrating a gate voltage controller of FIG. 5 according to example embodiments. FIG. 7 is a circuit diagram illustrating a gate voltage generator and a voltage buffer of FIG. 6 according to example embodiments. For brevity of illustration and convenience of description, components that are unnecessary to describe how to control or limit a charging current I_CH depending on an operation of the gate voltage controller 220 will be omitted. Also, to describe the technical idea of the inventive concept easily, embodiments of the inventive concept will be described on the basis of the charging or discharging of the flying capacitor CF. However, the inventive concept is not limited thereto.

Referring to FIGS. 5 to 7, the charging switch SW_CH (e.g., the fourth power switch PSW4 of FIG. 5) may be connected between the first node n1 and the ground node VSS and may operate in response to the gate voltage Vgate. In an exemplary embodiment, the flying capacitor CF may be connected between the first node n1 and the second node n2 (refer to FIG. 5). The flying capacitor CF may be charged by the charging current I_CH flowing through the charging switch SW_CH.

In an exemplary embodiment, a magnitude of the charging current I_CH may be defined by a drain-source voltage VDS and a gate-source voltage VGS of the charging switch SW_CH. That is, assuming that the gate-source voltage VGS is uniform, as the drain-source voltage VDS increases, the charging current I_CH may increase. In this case, in a specific condition (e.g., an initial charging state or a load change state), a voltage of the first node n1 may increase. The increase in the voltage of the first node n1 may result in an increase in the drain-source voltage VDS of the charging switch SW_CH. That is, as the voltage of the first node n1 increases, the charging current I_CH may increase. In this case, a magnitude of the charging current I_CH may be controlled or limited by controlling or limiting a magnitude of the gate-source voltage VGS of the charging switch SW_CH.

For example, the fourth switching signal SS4 for controlling the fourth power switch PSW4 (e.g., corresponding to the charging switch SW_CH) described with reference to FIG. 2 may be controlled based on the power supply voltage VDD (or the input voltage VIN) and the ground VSS.

In contrast, the gate voltage Vgate for controlling an operation of the charging switch SW_CH of FIGS. 5 and 6 may be controlled to a level lower than that of the power supply voltage VDD (or the input voltage VIN). In this case, because the gate-source voltage VGS of the charging switch SW_CH becomes relatively small, a magnitude of the charging current I_CH may be controlled or limited. For example, the charging current I_CH may be reduced by reducing the gate voltage Vgate.

The gate voltage controller 220 may generate the gate voltage Vgate having a level (or a peak level) lower than that of the fourth switching signal SS4. The gate voltage controller 220 may include a gate voltage generator 221 and a voltage buffer 222.

The gate voltage generator 221 may generate a pre-voltage Vpre based on the fourth switching signal SS4 (i.e., a switching signal for controlling an ON/OFF of the charging switch SW_CH). In an exemplary embodiment, the pre-voltage Vpre may be a signal synchronized with the fourth switching signal SS4 and may have a peak level (or, the maximum level) lower than a peak level of the fourth switching signal SS4 (or lower than a level of the power supply voltage VDD or the input voltage VIN). According to the level of the fourth switching signal SS4, a level of the pre-voltage Vpre may vary over time.

For example, as illustrated in FIG. 7, the gate voltage generator 221 may include a current source I0 and a conversion transistor CT. The current source I0 may be connected between a node of receiving the fourth switching signal SS4 and the conversion transistor CT. The current source I0 may provide a constant current of a fixed magnitude. The conversion transistor CT may be connected between the current source I0 and the ground node VSS and may operate in response to the pre-voltage Vpre of a node (e.g., a pre-node). For example, the gate voltage generator 221 may convert a constant current from the current source I0 to a voltage so as to be output as the pre-voltage Vpre.

In an exemplary embodiment, the constant current of the current source I0 may be provided in synchronization with the fourth switching signal SS4. A level or a peak level of the pre-voltage Vpre may be lower than a level or a peak level of the fourth switching signal SS4 (or may be lower than a level of the power supply voltage VDD or the input voltage VIN).

The voltage buffer 222 may buffer the pre-voltage Vpre to output the gate voltage Vgate. For example, the voltage buffer 222 may include a first amplifier AMP1. A non-inverting input terminal (+) of the first amplifier AMP1 may receive the pre-voltage Vpre, and an inverting input terminal (−) and an output terminal of the first amplifier AMP1 may be connected. For example, the first amplifier AMP1 may amplify or buffer the pre-voltage Vpre to output the gate voltage Vgate through the output terminal. In an exemplary embodiment, the first amplifier AMP1 may be a unit gain buffer.

For example, as described above, as the charging switch SW_CH is controlled by using the gate voltage Vgate having a relatively low level (or a low peak level) compared to the fourth switching signal SS4, a magnitude of the charging current I_CH flowing through the charging switch SW_CH may be controlled or limited. In an exemplary embodiment, a maximum level of the charging current I_CH thus limited may be equal to or less than 3 A.

Figure 8:
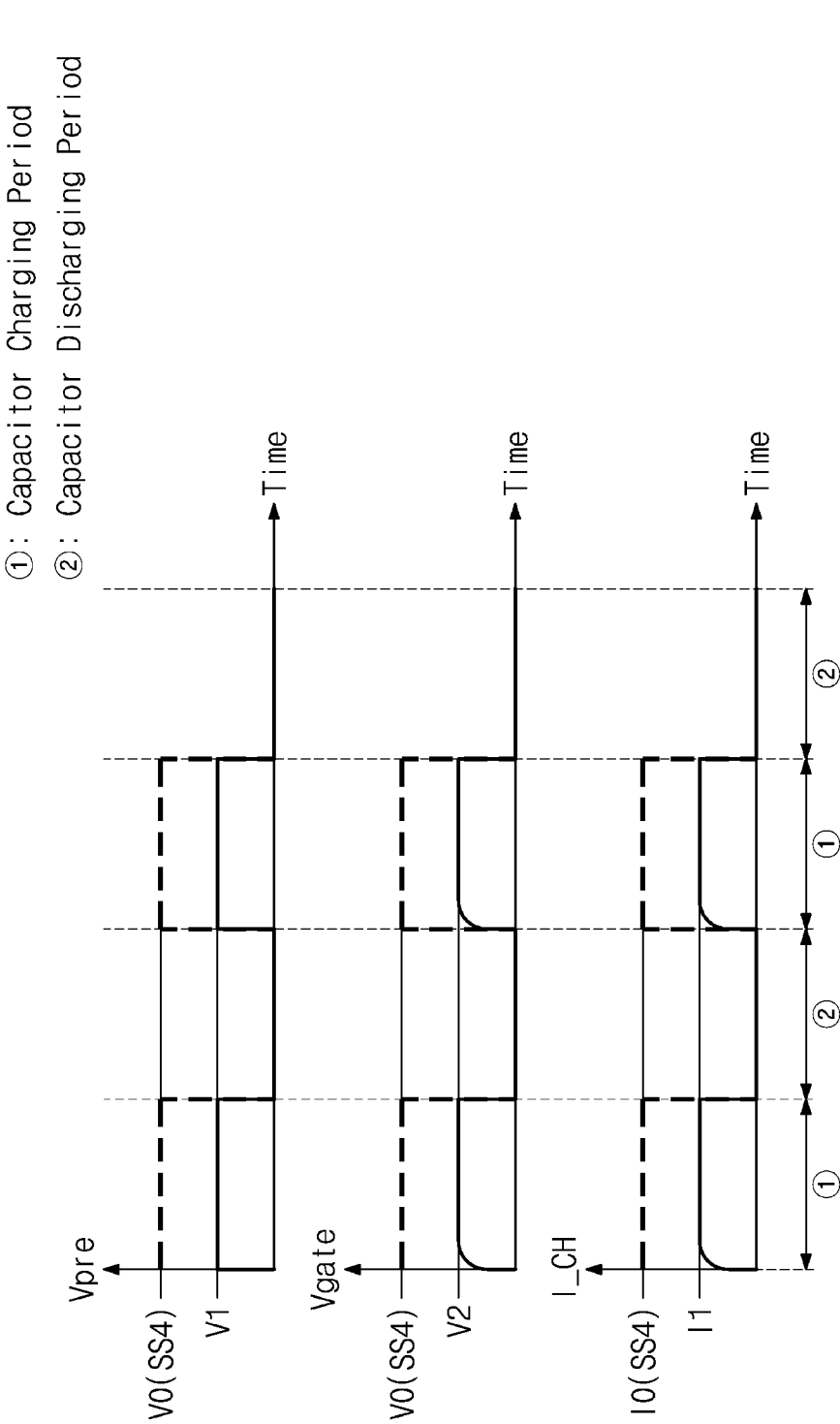
FIG. 8 illustrates timing diagrams for describing an operation of a gate voltage controller of FIG. 7 according to example embodiments.

FIG. 8 illustrates timing diagrams for describing an operation of a gate voltage controller of FIG. 7 according to example embodiments. In the timing diagrams of FIG. 8, horizontal axes represent a time, and vertical axes represent a magnitude of the pre-voltage Vpre, a magnitude of the gate voltage Vgate, and a magnitude of the charging current I_CH. For brevity of illustration, a configuration in which the fourth switching signal SS4 based on the input voltage VIN is directly provided to the charging switch SW_CH is marked by a dash-single dotted line, and a configuration in which the gate voltage Vgate according to the inventive concept is provided to the charging switch SW_CH is marked by a solid line.

For brevity of illustration and convenience of description, regardless of an operation mode of the voltage converter 200, each configuration will be described on the basis of the charging and discharging of the flying capacitor CF.

Referring to FIGS. 5 to 8, the flying capacitor CF may be charged in a period ①, the flying capacitor CF may be discharged in a period E. For convenience of description, an embodiment will be described on the basis of the charging of the flying capacitor CF.

In the period ①, in the case where the fourth switching signal SS4 based on the input voltage VIN is applied to the gate of the charging switch SW_CH, the charging current I_CH may be a 0-th current I0.

In contrast, as described above, according to an embodiment of the inventive concept, the pre-voltage Vpre may be a first voltage V1 smaller than that of the fourth switching signal SS4, and thus, the gate voltage Vgate may be a second voltage V2 smaller than that of the fourth switching signal SS4. As the second voltage V2 smaller than that of the fourth switching signal SS4 is applied to the gate of the charging switch SW_CH, the gate-source voltage VGS may become relatively small. As such, the charging current I_CH may be a first current I1 lower than the 0-th current I0. Levels of the pre-voltage Vpre and the gate voltage Vgate may be determined by levels of the fourth switching signal SS4 and the input voltage VIN. For example, in the charging period of the flying capacitor CF, a magnitude of the charging current I_CH may be controlled or limited by decreasing the gate voltage Vgate provided to the gate of the charging switch SW_CH. This may mean that the reliability and stability of the voltage converter 200 or the electronic system 10 including the voltage converter 200 are improved.

Figure 9:
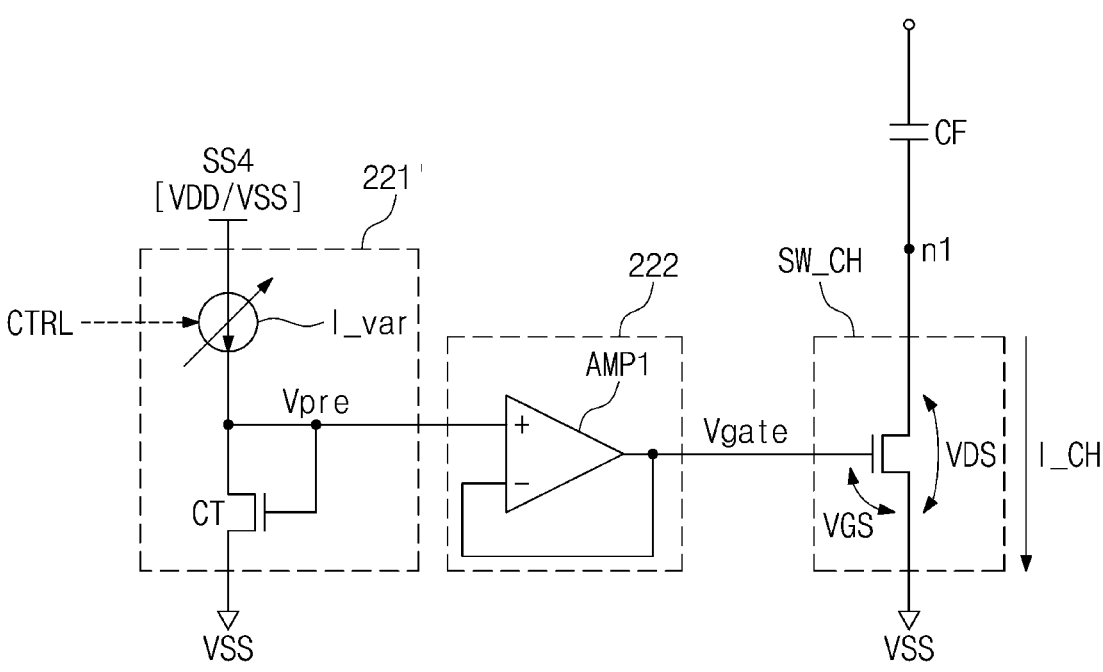
FIG. 9 is a circuit diagram illustrating a gate voltage generator and a voltage buffer of FIG. 6 according to example embodiments.

FIG. 9 is a circuit diagram illustrating a gate voltage generator and a voltage buffer of FIG. 6 according to example embodiments. Referring to FIGS. 6 and 9, the charging switch SW_CH may be connected between the flying capacitor CF and the ground node VSS and may operate in response to the gate voltage Vgate. A gate voltage generator 221' may generate the pre-voltage Vpre. The voltage buffer 222 may include the first amplifier AMP1 configured to buffer the pre-voltage Vpre. The flying capacitor CF, the charging switch SW_CH, and the voltage buffer 222 are described above, and thus, additional description will be omitted to avoid redundancy.

The gate voltage generator 221' may include a variable current source I_var and the conversion transistor CT. The operation and the connection relationship of the conversion transistor CT are similar to that described with reference to FIG. 7, and thus, additional description will be omitted to avoid redundancy.

Unlike the embodiment of FIG. 7, the gate voltage generator 221' of FIG. 9 may include the variable current source I_var. The variable current source I_var may be connected between a node of receiving the fourth switching signal SS4 and a node from which the pre-voltage Vpre is output. A variable current from the variable current source I_var may be controlled in response to a control signal CTRL.

As the variable current from the variable current source I_var is controlled, a magnitude of the charging current I_CH may be controlled or limited. For example, as described above, a level of the pre-voltage Vpre may correspond to a magnitude of the variable current of the variable current source I_var. For example, in the case where the variable current from the variable current source I_var decreases, a level of the pre-voltage Vpre may decrease, and thus, the gate voltage Vgate may decrease. As the gate voltage Vgate decreases, the gate-source voltage VGS of the charging switch SW_CH may decrease. This may mean that a magnitude of the charging current I_CH is controlled or limited. For example, in a specific condition, a magnitude of the charging current I_CH flowing through the charging switch SW_CH may be controlled or limited by controlling the variable current of the variable current source I_var in response to the control signal CTRL.

In an exemplary embodiment, the control signal CTRL may be generated based on a voltage of the first node n1. For example, as the voltage of the first node n1 increases, the drain-source voltage VDS of the charging switch SW_CH may increase. As such, a magnitude of the charging current I_CH may increase. In this case, to suppress the increase in the charging current I_CH, the control signal CTRL may be generated such that the variable current of the variable current source I_var decreases. Although not illustrated in drawing, the voltage converter 200 may further include a separate control circuit configured to detect a voltage of the first node n1 and to generate the control signal CTRL based on the detected voltage.

Figure 10:
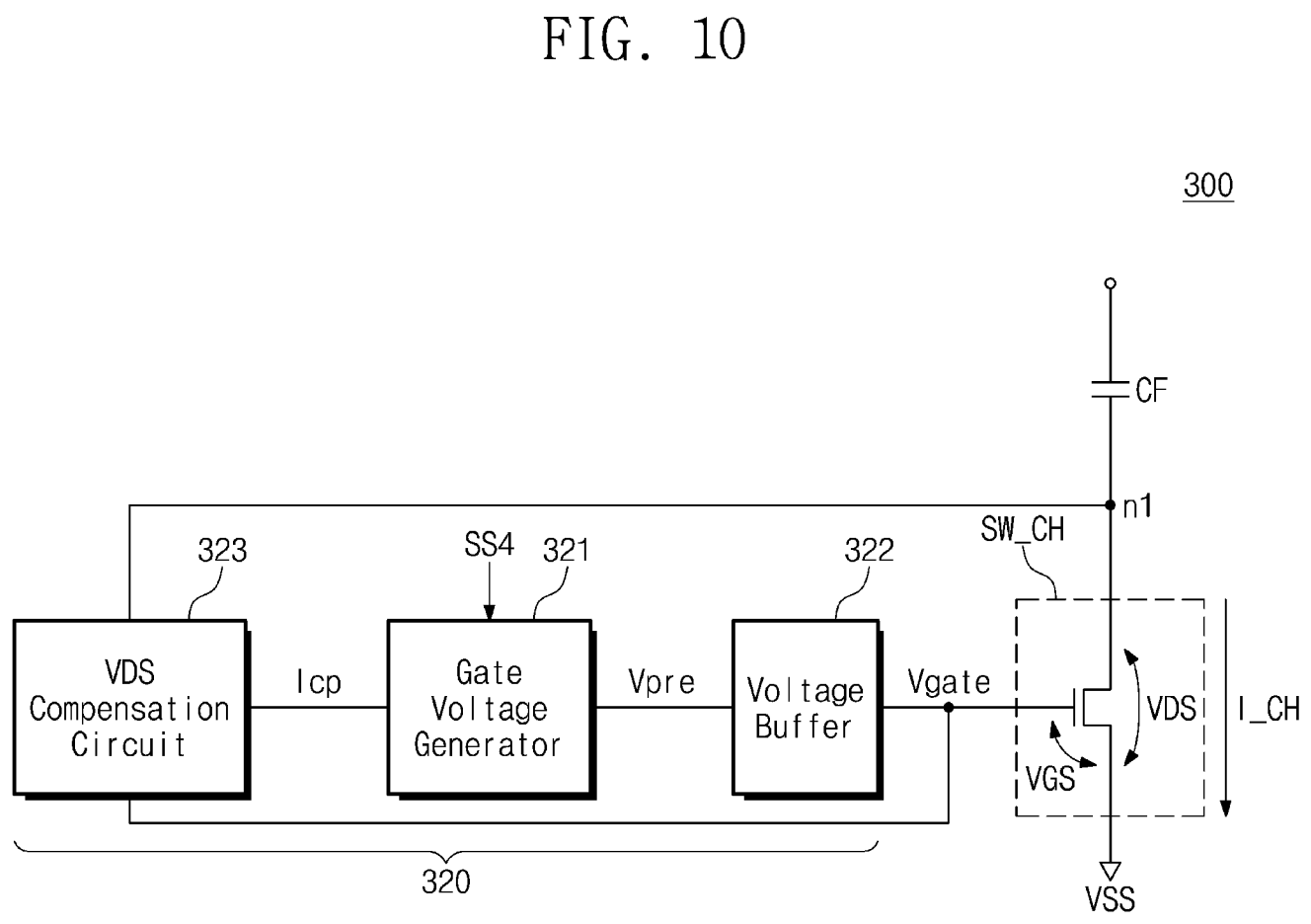
Figure 11:
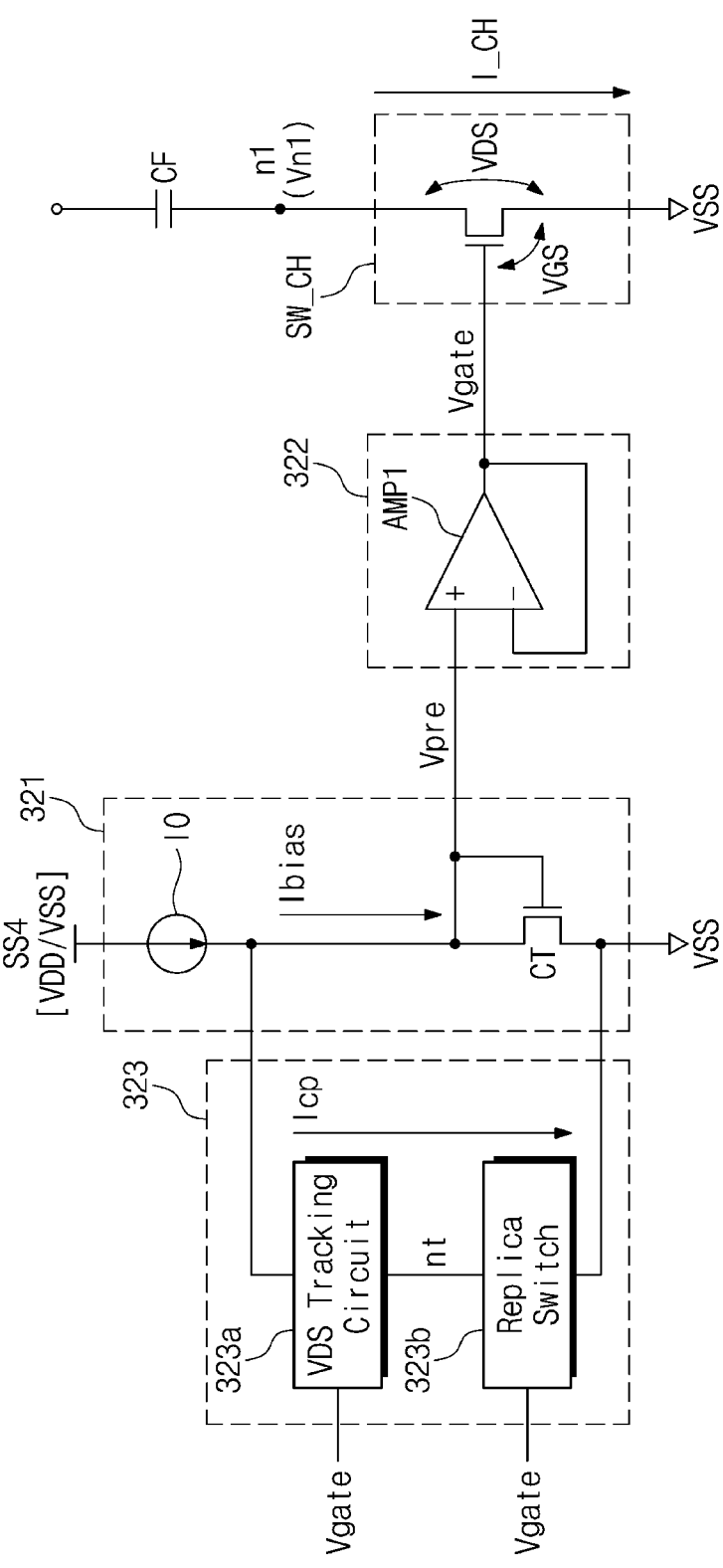
FIG. 11 is a diagram illustrating a gate voltage controller of FIG. 10 in detail according to example embodiments.

FIG. 10 is a block diagram illustrating a voltage converter according to an embodiment of the inventive concept. FIG. 11 is a diagram illustrating a gate voltage controller of FIG. 10 in detail according to example embodiments. For brevity of illustration, components that are unnecessary to describe an operation of controlling or limiting the charging current I_CH are omitted.

Referring to FIG. 10, a voltage converter 300 may include the flying capacitor CF, the charging switch SW_CH, and a gate voltage controller 320. In an exemplary embodiment, the voltage converter 300 may be the voltage converter 100 described with reference to FIG. 2 or the voltage converter 200 described with reference to FIG. 5 and may further include any other components (e.g., the power switches, the inductor "L", the load capacitor CL, and the power switch controller 110 or 210) not illustrated in FIG. 10.

The charging switch SW_CH may be connected between the flying capacitor CF and the ground node VSS and may operate in response to the gate voltage Vgate. The gate voltage controller 320 may include a gate voltage generator 321, a voltage buffer 322, and a drain-source compensation circuit (hereinafter referred to as a "VDS compensation circuit") 323.

The voltage buffer 322 may include the first amplifier AMP1 configured to buffer the pre-voltage Vpre to output the gate voltage Vgate. The first amplifier AMP1 included in the voltage buffer 322 is described above, and thus, additional description will be omitted to avoid redundancy.

The VDS compensation circuit 323 may generate a compensation current Icp based on the gate voltage Vgate and a voltage of the first node n1. In an exemplary embodiment, the compensation current Icp may be a current corresponding to the voltage of the first node n1. In an exemplary embodiment, as the voltage of the first node n1 increases, a magnitude of the compensation current Icp may increase.

The gate voltage generator 321 may generate the pre-voltage Vpre based on the fourth switching signal SS4 and the compensation current Icp.

For example, as illustrated in FIG. 7, the gate voltage generator 321 may include the current source I0 and the conversion transistor CT. The connection relationship of the current source I0 and the conversion transistor CT are described above, and thus, additional description will be omitted to avoid redundancy.

Referring to FIG. 10, the VDS compensation circuit 323 may include a drain-source voltage (VDS) tracking circuit (hereinafter referred to as a "VDS tracking circuit") 323a and a replica switch 323b. The VDS tracking circuit 323a may be connected between the current source I0 and a tracking node nt. The replica switch 323b may be connected between the tracking node nt and the ground node VSS.

The VDS tracking circuit 323a may be configured to track a voltage Vn1 of the first node n1. For example, a voltage Vnt of the tracking node nt may become substantially identical to the voltage Vn1 of the first node n1 by the VDS tracking circuit 323a.

The replica switch 323b may be a replica for the charging switch SW_CH. For example, compared to the charging switch SW_CH, the replica switch 323b may be controlled by the same bias (e.g., the same drain voltage, the same source voltage, and the same gate voltage). In this case, the compensation current Icp flowing through the replica switch 323b may have the same ratio as the charging current I_CH of the charging switch SW_CH. For example, in the case where the charging current I_CH increases, the compensation current Icp may increase at the same ratio. For example, a ratio of the compensation current Icp to the charging current I_CH may be 1:n (n being a positive integer).

In an exemplary embodiment, the replica switch 323b and the charging switch SW_CH may have the same channel length, and a ratio of a channel width of the replica switch 323b to a channel width of the charging switch SW_CH may be uniform. For example, a ratio of the channel width of the replica switch 323b to the channel width of the charging switch SW_CH may be 1:m (m being a positive integer).

As described above, as the voltage of the first node n1 increases, the charging current I_CH flowing through the charging switch SW_CH may increase. In this case, a magnitude of the compensation current Icp generated by the VDS compensation circuit 323 may increase. As the magnitude of the compensation current Icp increases, a magnitude of the pre-voltage Vpre may decrease.

For example, a voltage level of the pre-voltage Vpre may correspond to a magnitude of a bias current Ibias. The bias current Ibias may correspond to a difference between a constant current of the current source I0 and the compensation current Icp of the VDS compensation circuit 323. In this case, because a magnitude of the constant current of the current source I0 is fixed, as the compensation current Icp increases, the bias current Ibias may decrease. As such, a level of the pre-voltage Vpre may decrease.

As a result, in various situations (e.g., an initial charging situation and a load change situation), the voltage Vn1 of the first node n1 increases, the compensation current Icp may be increased by the VDS compensation circuit 323, the bias current Ibias may be decreased by the increased compensation current Icp, the pre-voltage Vpre may be decreased by the decreased bias current Ibias, and the gate voltage Vgate may be decreased by the decreased pre-voltage Vpre. Accordingly, a magnitude of the charging current I_CH flowing through the charging switch SW_CH may be controlled or limited by the decreased gate voltage Vgate.

Figure 12:
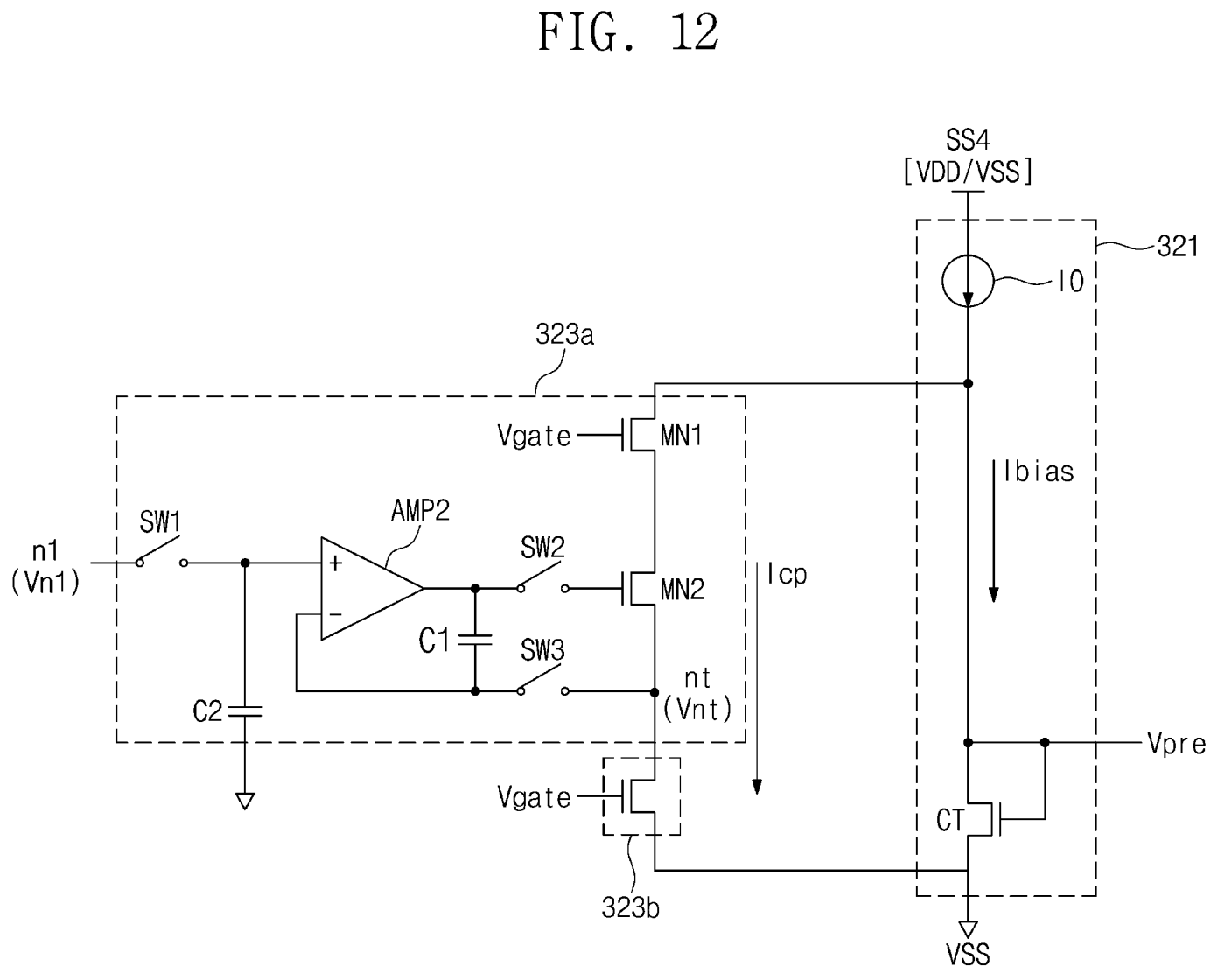

FIG. 12 is a circuit diagram illustrating a VDS tracking circuit and a replica switch of FIG. 11 in detail according to example embodiments. For brevity of illustration, components unnecessary to describe the VDS tracking circuit 323a and the replica switch 323b and the detailed description of the components will be omitted.

Referring to FIGS. 10 to 12, the gate voltage generator 321 may include a current source I0 that is connected between a node of receiving the fourth switching signal SS4 and a node of outputting the pre-voltage Vpre and the conversion transistor CT that is connected between the node of outputting the pre-voltage Vpre and the ground node VSS and operates in response to the node of outputting the pre-voltage Vpre. The gate voltage generator 321 may output the pre-voltage Vpre corresponding to the bias current Ibias that is obtained by subtracting the compensation current Icp from a current supplied by the current source TO.

The VDS tracking circuit 323a may include first and second transistors MN1 and MN2, first to third switches SW1 to SW3, first and second capacitors C1 and C2, and a second amplifier AMP2.

The first and second transistors MN1 and MN2 may be connected in series between the current source TO and the tracking node nt. The first transistor MN1 may turn on or turn off in response to the gate voltage Vgate. A gate of the second transistor MN2 may be connected with the second switch SW2.

The first switch SW1 may be connected between the first node n1 and a non-inverting input terminal (+) of the second amplifier AMP2. The second switch SW2 may be connected between an output terminal of the second amplifier AMP2 and a gate of the second transistor MN2. The third switch SW3 may be connected between an inverting input terminal (−) of the second amplifier AMP2 and the tracking node nt. Each of the first to third switches SW1 to SW3 may operate in response to the gate voltage Vgate. For example, when the gate voltage Vgate is the on-voltage ON, the first to third switches SW1 to SW3 may be turned on; when the gate voltage Vgate is the off-voltage OFF, the first to third switches SW1 to SW3 may be turned off.

The first capacitor C1 may be connected between the output terminal and the inverting input terminal (−) of the second amplifier AMP2. The second capacitor C2 may be connected between the non-inverting input terminal (+) of the second amplifier AMP2 and the ground node VSS.

As described above, the VDS tracking circuit 323a may be implemented with an error amplifier that operates based on the voltage Vn1 of the first node n1 and the gate voltage Vgate, and the voltage Vnt of the tracking node nt may be identical to the voltage Vn1 of the first node n1 through the channel length modulation.

The replica switch 323b may include a transistor that is connected between the tracking node nt and the ground node VSS and operates in response to the gate voltage Vgate. Because the voltage Vnt of the tracking node nt becomes identical to the voltage Vn1 of the first node n1 by the VDS tracking circuit 323a, the replica switch 323b may have the same bias as the charging switch SW_CH. In this case, the compensation current Icp flowing through the replica switch 323b may be 1/n times the charging current I_CH. For example, as the charging current I_CH increases, the compensation current Icp may increase at a uniform ratio. The following operation is described above, and thus, additional description will be omitted to avoid redundancy.

Figure 13:
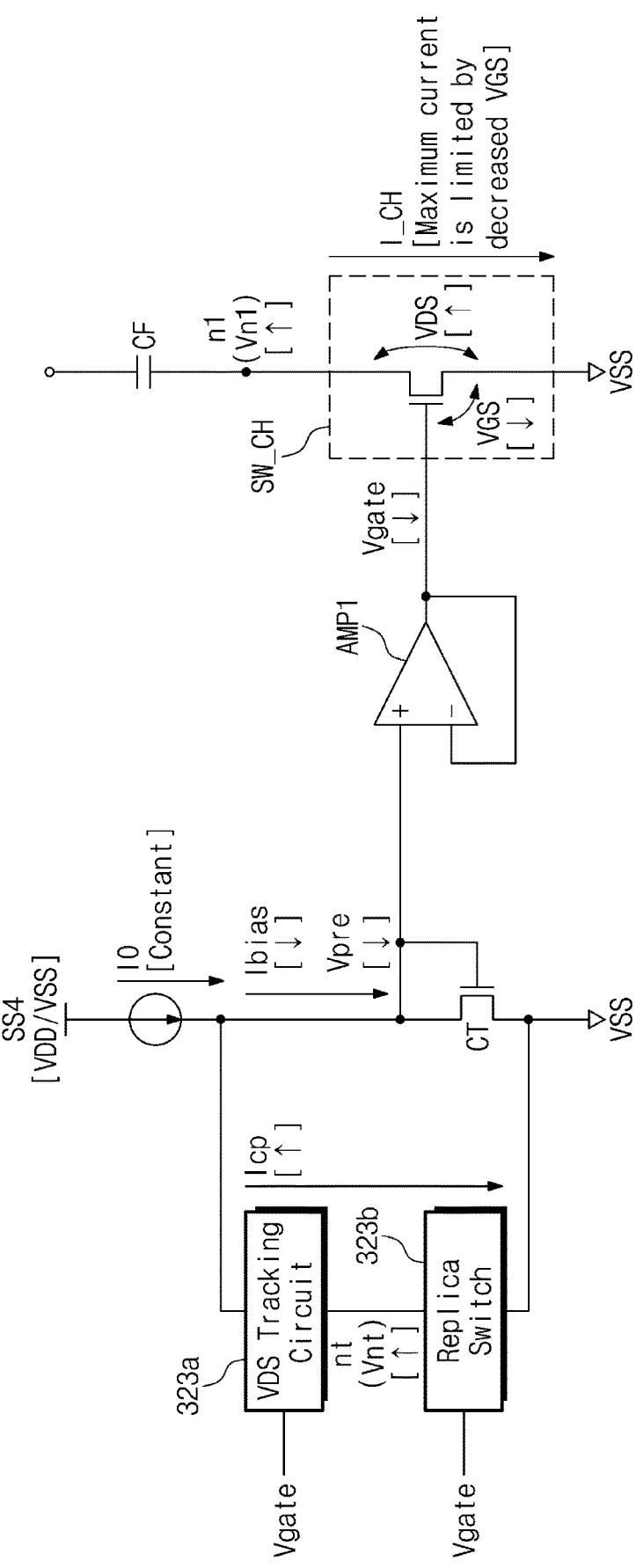
FIG. 13 is a diagram for describing how a gate voltage controller of FIG. 11 controls or limits a charging current according to example embodiments.

FIG. 13 is a diagram for describing how a gate voltage controller of FIG. 11 controls or limits a charging current according to example embodiments. For convenience of description, additional description associated with the components described above will be omitted to avoid redundancy. For convenience of description, it is assumed that the flying capacitor CF is in a state of being charged by the charging current I_CH. Respective components will be sequentially described, and the inventive concept is not limited thereto.

Referring to FIGS. 11 and 13, in an initial charging situation or a load change situation associated with the flying capacitor CF, the voltage Vn1 of the first node n1 may increase (↑). As such, the drain-source voltage VDS of the charging switch SW_CH may increase (↑). In an exemplary embodiment, in the case where the fourth switching signal SS4 based on the power supply voltage VDD or the input voltage VIN is directly applied to the gate of the charging switch SW_CH, the charging current I_CH may be increased by the increased drain-source voltage VDS. In contrast, the voltage converter 300 according to an embodiment of the inventive concept may control the gate voltage Vgate that is provided to the gate of the charging switch SW_CH.

For example, as the voltage Vn1 of the first node n1 increases (↑), the voltage Vnt of the tracking node nt may be increased by the VDS tracking circuit 323a (↑). In this case, the compensation current Icp flowing through the replica switch 323b may increase. Because a current of the current source I0 is uniform, as the compensation current Icp increases, the bias current Ibias may decrease (↓). As such, the pre-voltage Vpre may decrease (↓). As the pre-voltage Vpre decreases (↓), the gate voltage Vgate may decrease (↓). As such, the gate-source voltage VGS of the charging switch SW_CH may decrease (↓). A maximum current or a peak level of the charging current I_CH may be limited by the decreased gate-source voltage VGS.

Figure 14:
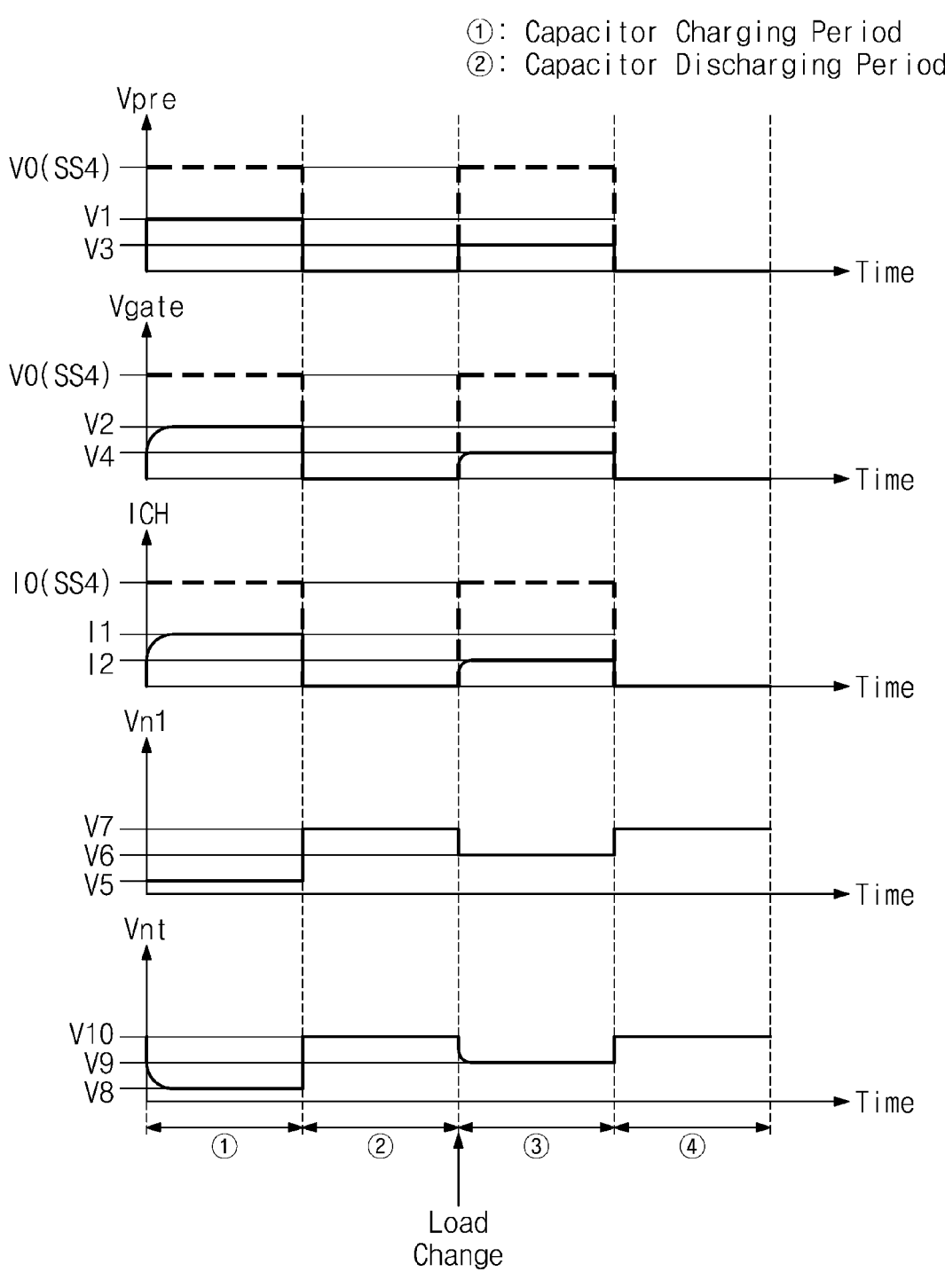
FIG. 14 illustrates timing diagrams for describing a charging current controlling or limiting operation of FIG. 13 according to example embodiments.

FIG. 14 illustrates timing diagrams for describing a charging current controlling or limiting operation of FIG. 13 according to example embodiments. In the timing diagrams of FIG. 14, horizontal axes represent a time, and vertical axes represent the pre-voltage Vpre, the gate voltage Vgate, the charging current I_CH, the voltage Vn1 of the first node n1, and the voltage Vnt of the tracking node nt.

For brevity of illustration, a configuration in which fourth switching signal SS4 based on the input voltage VIN is directly provided to the charging switch SW_CH is marked by a dash-single dotted line, and a configuration in which the gate voltage Vgate according to the inventive concept is provided to the charging switch SW_CH is marked by a solid line. For brevity of illustration and convenience of description, regardless of an operation mode of the voltage converter 200, each configuration will be described on the basis of the charging and discharging of the flying capacitor CF.

Referring to FIGS. 11, 13, and 14, the flying capacitor CF may be charged in a period ① and a period a; the flying capacitor CF may be discharged in a period ② and a period ④. For convenience of description, an embodiment will be described on the basis of the charging of the flying capacitor CF.

The pre-voltage Vpre, the gate voltage Vgate, and the charging current I_CH in the periods ① and ② of FIG. 14 are similar to those in the periods ① and ② of FIG. 8, and thus, additional description will be omitted to avoid redundancy.

In the period ①, the voltage Vn1 of the first node n1 may be a fifth voltage V5, and the voltage Vnt of the tracking node nt may be an eighth voltage V8. In an exemplary embodiment, the fifth voltage V5 and the eighth voltage V8 may be identical. In the period ②, the voltage Vn1 of the first node n1 may be a seventh voltage V7, and the voltage Vnt of the tracking node nt may be a tenth voltage V10. In an exemplary embodiment, the seventh voltage V7 and the tenth voltage V10 may be identical.

In an exemplary embodiment, a load may change at a time point when the period ② ends or at any other time point. For example, a target to which the output voltage VOUT of the voltage converter 300 is provided may be changed, or the number of targets may increase. In this case, in the period ③ being a charging period, the voltage Vn1 of the first node n1 may be a sixth voltage V6 greater than the fifth voltage V5. In this case, as described above, as the voltage Vn1 of the first node n1 increases, a magnitude of the charging current I_CH may increase.

However, according to an embodiment of the inventive concept, in the period ③ being the charging period, the voltage Vn1 of the first node n1 may be the sixth voltage V6 greater than the fifth voltage V5, and thus, the voltage Vnt of the tracking node nt may be a ninth voltage V9 greater than the eighth voltage V8. For example, compared to the previous charging period (the period ①), the voltage Vnt of the tracking node nt may increase together with the increase in the voltage Vn1 of the first node n1. As such, as described above, the pre-voltage Vpre may be a third voltage V3 smaller than the first voltage V1, and the gate voltage Vgate may be a fourth voltage V4 smaller than the second voltage V2. As the gate voltage Vgate decreases to the fourth voltage V4, a magnitude of the charging current I_CH may be controlled or limited to a second current I2, the magnitude of which is smaller than that of the first current I1.

In an exemplary embodiment, after the load change, in the case where the flying capacitor CF is sufficiently charged, during the charging period, the voltage Vn1 of the first node n1 may be the fifth voltage V5. In this case, an operation of the voltage converter 300 may be identical to the operation of the period ①.

Figure 15:
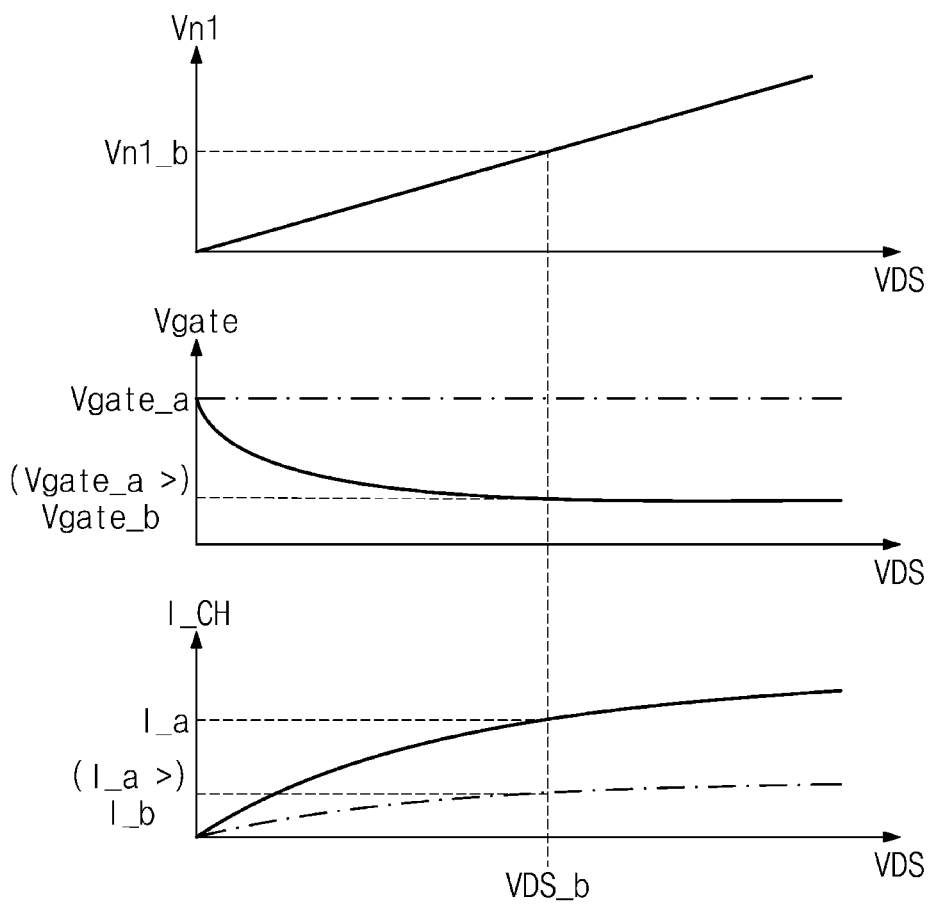
FIG. 15 illustrates graphs for describing a charging current controlling or limiting effect of a voltage converter according to an embodiment of the inventive concept.

FIG. 15 illustrates graphs for describing a charging current controlling or limiting effect of a voltage converter according to an embodiment of the inventive concept. In the graphs of FIG. 15, horizontal axes represent a drain-source voltage of the charging switch SW_CH, and vertical axes represent the voltage Vn1 of the first node n1, the gate voltage Vgate, and the charging current I_CH.

In the graphs of FIG. 15, to describe an effect of a voltage converter according to the inventive concept clearly, an embodiment where the gate voltage Vgate is uniform (or constant) is marked by a dash-single dotted line, and an embodiment where the gate voltage Vgate varies depending on the voltage Vn1 of the first node is marked by a solid line. The graphs illustrated in FIG. 15 are only for describing an effect according to embodiments of the inventive concept, and the inventive concept is not limited thereto.

Referring to FIGS. 11 and 15, as the voltage Vn1 of the first node n1 increases, the drain-source voltage VDS of the charging switch SW_CH may increase. As such, the charging switch SW_CH may increase.

In this case, a maximum magnitude of the charging current I_CH may be controlled or limited by adjusting the gate voltage Vgate depending on the voltage Vn1 of the first node n1. For example, in the case where the voltage Vn1 of the first node n1 is Vn1_0, the drain-source voltage VDS may be VDS_0.

In the case where the drain-source voltage VDS is VDS_0 and the gate voltage Vgate is uniform (or constant), for example, is maintained at Vgate_a, a magnitude of the charging current I_CH may be I_a. In contrast, in the case where the drain-source voltage VDS is VDS_0 and the gate voltage Vgate is adjusted to Vgate_b (smaller than Vgate_a) depending on the voltage Vn1 of the first node n1, a magnitude of the charging current I_CH may be I_b (smaller than I_a). For example, a situation where the charging current I_CH excessively increases may be prevented by decreasing the gate voltage Vgate depending on the voltage Vn1 of the first node n1.

Figure 16:
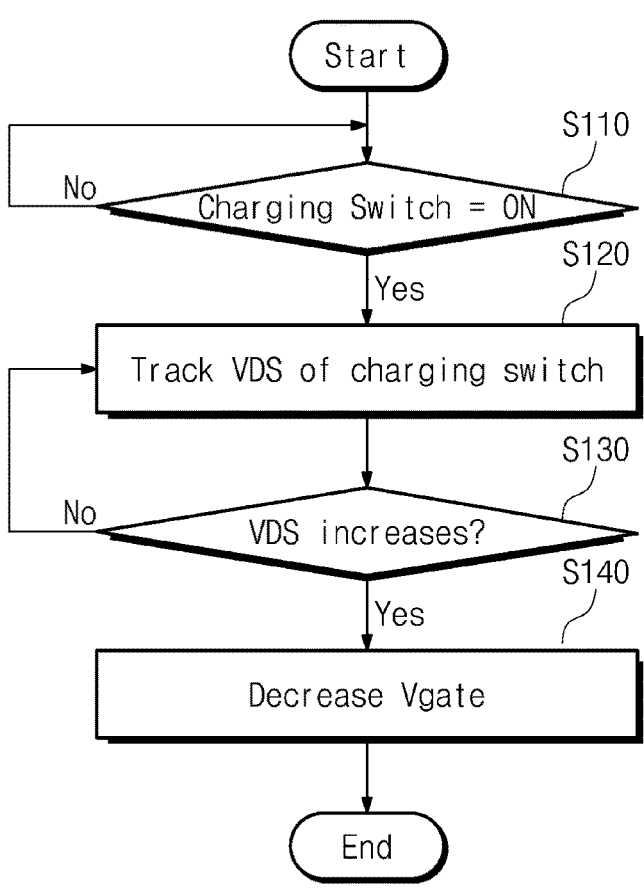
FIG. 16 is a flowchart illustrating an operation of a voltage converter according to an embodiment of the inventive concept.

FIG. 16 is a flowchart illustrating an operation of a voltage converter according to an embodiment of the inventive concept. For convenience of description, the flowchart of FIG. 16 will be described with reference to the voltage converter 300 of FIG. 10. However, the inventive concept is not limited thereto.

Referring to FIGS. 10 and 16, in operation S110, the voltage converter 300 may determine whether the charging switch SW_CH is in a turn-on state. In an exemplary embodiment, when the charging switch SW_CH is not in the turn-on state (i.e., is in a turn-off state), because the charging current I_CH does not flow through the charging switch SW_CH, a charging current limiting operation may not be performed.

When the charging switch SW_CH is in the turn-on state, in operation S120, the voltage converter 300 may track the drain-source voltage VDS of the charging switch SW_CH. For example, as described above, the drain-source voltage VDS of the charging switch SW_CH may correspond to the voltage Vn1 of the first node n1 between the flying capacitor CF and the charging switch SW_CH. The VDS tracking circuit 323a of the voltage converter 300 may track the voltage Vn1 of the first node n1.

In operation S130, the voltage converter 300 may determine whether the drain-source voltage VDS is increased. For example, the voltage converter 300 may determine whether the tracked voltage is increased above the tracked voltage in a previous charging period. In an exemplary embodiment, operation S130 may correspond to generating the compensation current Icp of the VDS compensation circuit 323. When it is determined that the tracked voltage is not increased (or that the tracked voltage does not vary), the voltage converter 300 may perform operation S120.

When it is determined that the tracked voltage is increased, in operation S140, the voltage converter 300 may decrease the gate voltage Vgate that is provided to the charging switch SW_CH. For example, as described above, the gate voltage controller 320 of the voltage converter 300 may decrease the gate voltage Vgate based on an increment of the voltage Vn1 of the first node n1.

Figure 17:
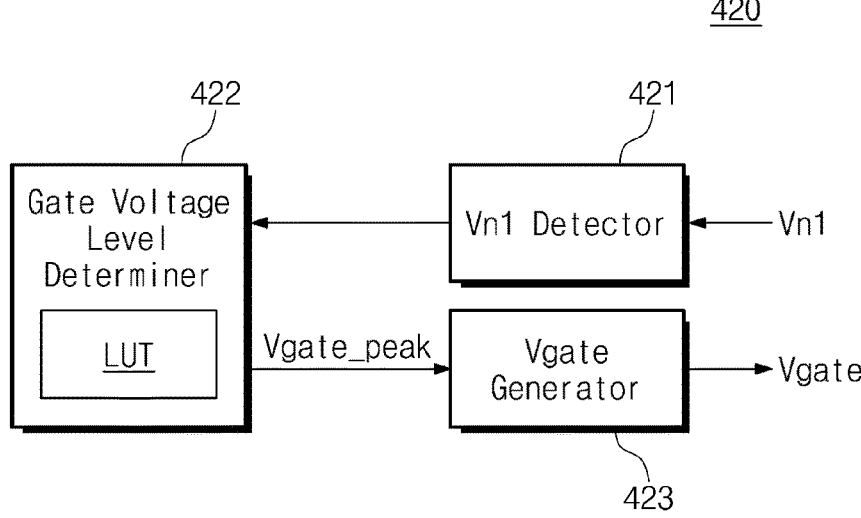
FIG. 17 is a block diagram illustrating a gate voltage controller according to an embodiment of the inventive concept.

FIG. 17 is a block diagram illustrating a gate voltage controller according to an embodiment of the inventive concept. For convenience of description, only a configuration of a gate voltage controller 420 is illustrated in FIG. 17, but the inventive concept is not limited thereto. For example, the gate voltage controller 420 of FIG. 17 may be replaced with the gate voltage controller 120, 220, or 320 described above.

Referring to FIG. 17, the gate voltage controller 420 may include a first node voltage detector 421, a gate voltage level determiner 422, and a gate voltage generator 423. The first node voltage detector 421 may detect a first node voltage Vn1. For example, the first node voltage Vn1 may be a voltage of a node between the flying capacitor CF and the charging switch SW_CH as described with reference to FIG. 10 and may correspond to the drain-source voltage VDS of the charging switch SW_CH.

The gate voltage level determiner 422 may determine a gate voltage peak level Vgate_peak based on the first node voltage Vn1 detected by the first node voltage detector 421. For example, the gate voltage level determiner 422 may include a lookup table LUT that includes information about a relationship of the first node voltage Vn1 and the gate voltage peak level Vgate_peak. The gate voltage level determiner 422 may determine the gate voltage peak level Vgate_peak corresponding to the first node voltage Vn1 thus detected, by using the lookup table LUT.

In an exemplary embodiment, the lookup table LUT may include information about the gate voltage peak level Vgate_ peak for a period of the first node voltage Vn1. For example, when the first node voltage Vn1 is included in a first period, the gate voltage peak level Vgate_peak may be determined as a first value; when the first node voltage Vn1 is included in a second period, the gate voltage peak level Vgate_peak may be determined as a second value; and, when the first node voltage Vn1 is included in a k-th period, the gate voltage peak level Vgate_peak may be determined as a k-th value. In an exemplary embodiment, as the first node voltage Vn1 increases, the gate voltage peak level Vgate_peak may decrease.

The gate voltage generator 423 may generate the gate voltage Vgate based on the gate voltage peak level Vgate_ peak thus determined. In an exemplary embodiment, a maximum level of the gate voltage Vgate thus generated may be equal to or smaller than the gate voltage peak level Vgate_peak.

Figure 18:
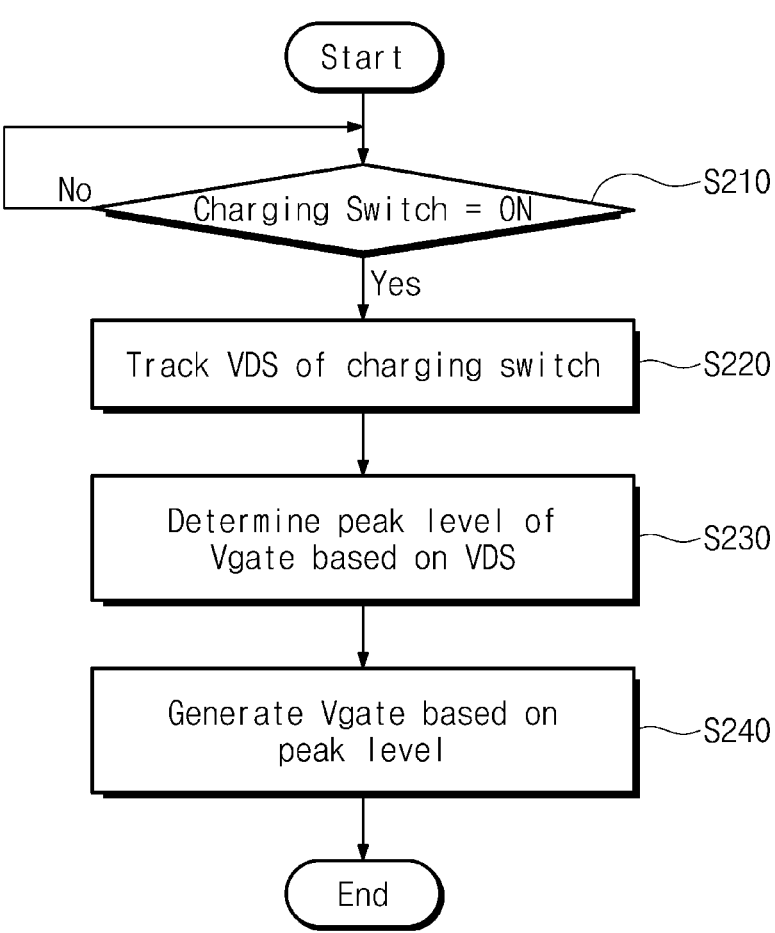
FIG. 18 is a flowchart illustrating an operation of a gate voltage controller of FIG. 17 according to example embodiments.

FIG. 18 is a flowchart illustrating an operation of a gate voltage controller of FIG. 17 according to example embodiments. Referring to FIGS. 17 and 18, in operation S210, the gate voltage controller 420 may determine whether the charging switch SW_CH is in a turn-on state. In an exemplary embodiment, when the charging switch SW_CH is not in the turn-on state (i.e., is in a turn-off state), because the charging current I_CH does not flow through the charging switch SW_CH, a charging current limiting operation may not be performed.

When the charging switch SW_CH is in the turn-on state, in operation S220, the gate voltage controller 420 may detect the drain-source voltage VDS of the charging switch SW_CH (i.e., the first node voltage Vn1).

In operation S230, the gate voltage controller 420 may determine a gate voltage peak level Vgate_peak based on the detected drain-source voltage VDS (i.e., the first node voltage Vn1). In an exemplary embodiment, as the detected drain-source voltage VDS (i.e., the first node voltage Vn1) increases, the gate voltage peak level Vgate_peak may become lower.

In operation S240, the gate voltage controller 420 may generate the gate voltage Vgate based on the gate voltage peak level Vgate_peak.

As described above, gate voltage controllers described with reference to FIGS. 1, 2, 3A to 3D, 4A to 4C, and 5 to 16 may be implemented in the form of an analog circuit, but the inventive concept is not limited thereto. For example, a gate voltage controller may be implemented in the form of a digital logic circuit as described with reference to FIG. 17 or 18.

In an exemplary embodiment, the lookup table LUT may be determined in advance or may be updated while the gate voltage controller 420 is operating. For example, the gate voltage controller 420 may further include a separate logic circuit configured to detect the charging current I_CH to update the lookup table LUT. The separate logic circuit may be configured to be provided with a magnitude of the charging current I_CH limited by controlling the gate voltage Vgate, to determine whether the charging current I_CH is limited to an intended level, and to update the lookup table LUT depending on a result of the determination.

Figure 19:
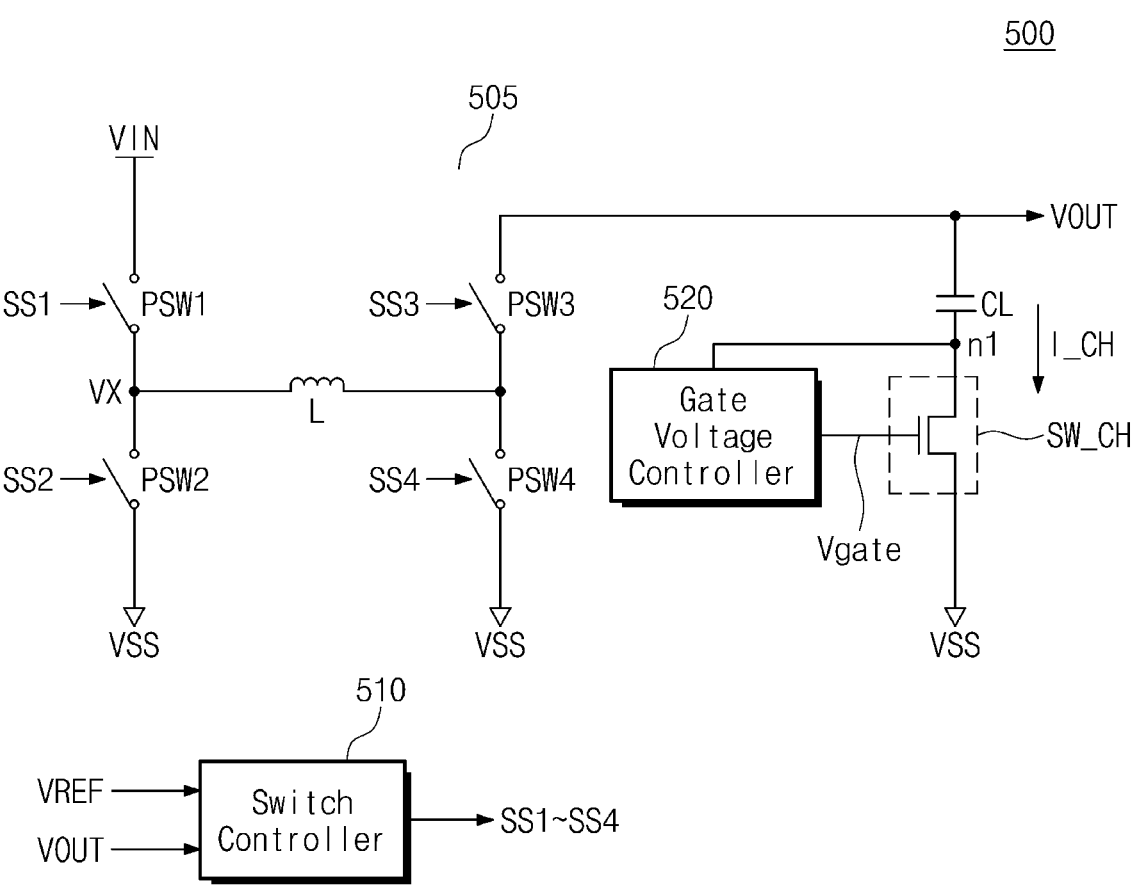
FIG. 19 is a block diagram illustrating a voltage converter according to an embodiment of the inventive concept.

FIG. 19 is a block diagram illustrating a voltage converter according to an embodiment of the inventive concept. Referring to FIG. 19, a voltage converter 500 may step up, step down, or step up and down the input voltage VIN to output the output voltage VOUT. The voltage converter 500 may include a charging circuit 505, the charging switch SW_CH, a power switch controller 510, and a gate voltage controller 520. For example, the charging circuit 505 may include the first to fourth power switches PSW1 to PSW4, the inductor "L", and the load capacitor CL.

The power switch controller 510 may select one of various operation modes (e.g., a buck mode, a buck-boost mode, and a boost mode) based on the reference voltage VREF and the output voltage VOUT and may generate the first to fourth switching signals SS1 to SS4 based on the selected operation mode. For example, in the case where the selected operation mode is the buck mode, the power switch controller 510 may generate the first to fourth switching signals SS1 to SS4 such that the first and second power switches PSW1 and PSW2 are alternately turned on/turned off, the third power switch PSW3 maintains a turn-on state, and the fourth power switch PSW4 maintains a turn-off state. For example, in the case where the selected operation mode is the buck-boost mode, the power switch controller 510 may generate the first to fourth switching signals SS1 to SS4 such that a group of the first and fourth power switches PSW1 and PSW4 and a group of the second and third power switches PSW2 and PSW3 are alternately turned on/turned off. For example, in the case where the selected operation mode is the boost mode, the power switch controller 510 may generate the first to fourth switching signals SS1 to SS4 such that the third and fourth power switches PSW3 and PSW4 are alternately turned on/turned off, the first power switch PSW1 maintains a turn-on state, and the second power switch PSW2 maintains a turn-off state.

The load capacitor CL may be connected between the first node n1 and the output node VOUT. The charging switch SW_CH may be connected between the first node n1 and the ground node VSS and may operate under control of the gate voltage controller 520.

The gate voltage controller 520 may be one of the gate voltage controllers 220, 320, and 420 described with reference to FIGS. 1, 2, 3A to 3D, 4A to 4C, and 5 to 18 and may control the gate voltage Vgate provided to the gate of the charging switch SW_CH depending on a voltage of the first node n1 as described above. For example, as a voltage of the first node n1 increases, the gate voltage Vgate applied to the gate of the charging switch SW_CH may decrease. As such, a magnitude of the charging current I_CH flowing through the charging switch SW_CH may be controlled or limited.

Figure 20:
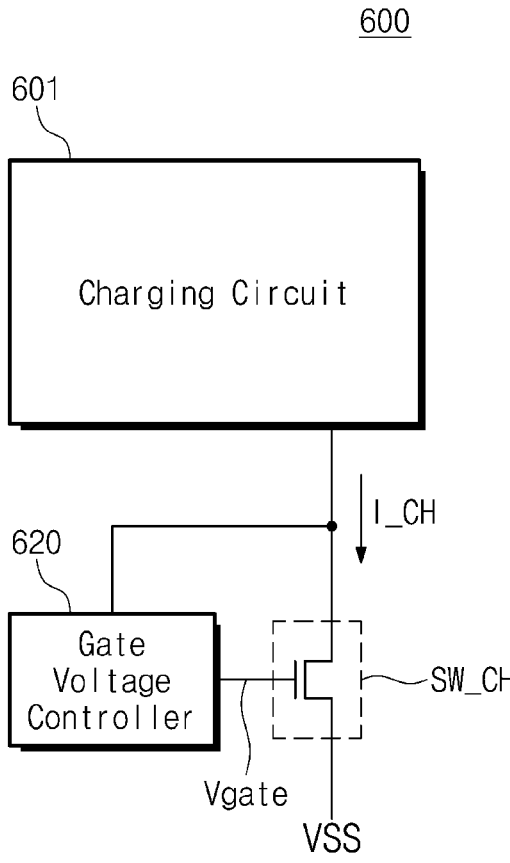
FIG. 20 is a diagram illustrating a power charger according to an embodiment of the inventive concept.

FIG. 20 is a diagram illustrating a power charger according to an embodiment of the inventive concept. Referring to FIG. 20, a power charger 600 (or a charging device) may include a charging circuit 601, the charging switch SW_CH, and a gate voltage controller 620.

The charging circuit 601 may be a device configured to charge a power from an electric power source. For example, the charging circuit 601 may be a device charging a battery or a device, which charges/discharges a power, such as a charge pump. In an exemplary embodiment, the charging circuit 601 may include at least a part of various power switches, various inductors, and various power capacitors described with reference to FIGS. 1, 2, 3A to 3D, 4A to 4C, and 5 to 9. For example, the charging circuit 601 may include the first, second, third, and fifth power switches PSW1, PSW2, PSW3, and PSW5, the flying capacitor CF, the inductor "L", and the load capacitor CL as shown in FIG. 5. However, the inventive concept is not limited thereto. For example, it may be understood that a structure or configuration of the charging circuit 601 is variously modified.

The charging switch SW_CH may be a switch for controlling the charging current I_CH used in a charging operation of the charging circuit 601. The gate voltage controller 620 may be a device configured to control or limit a magnitude of the charging current I_CH. In an exemplary embodiment, the charging switch SW_CH and the gate voltage controller 620 may perform operations similar to those of the charging switch SW_CH and the gate voltage controller 220, 320, 420, or 520 given with reference to FIGS. 1, 2, 3A to 3D, 4A to 4C, and 5 to 19.

FIG. 21 is a block diagram illustrating an electronic device according to the inventive concept. Referring to FIG. 21, an electronic device 1000 may include a main processor 1100, a touch panel 1200, a touch driving integrated circuit 1202, a display panel 1300, a display driving integrated circuit 1302, a system memory 1400, a storage device 1500, an audio processor 1600, a communication block 1700, an image processor 1800, and a power management integrated circuit 1900. In an exemplary embodiment, the electronic device 1000 may be one of various electronic devices such as a portable communication terminal, a personal digital assistant (PDA), a portable media player (PMP), a digital camera, a smartphone, a tablet computer, a laptop computer, and a wearable device.

The main processor 1100 may control overall operations of the electronic device 1000. The main processor 1100 may control or manage operations of the components of the electronic device 1000. The main processor 1100 may process various operations for the purpose of operating the electronic device 1000.

The touch panel 1200 may be configured to sense a touch input from a user under control of the touch driving integrated circuit 1202. The display panel 1300 may be configured to display image information under control of the display driving integrated circuit 1302.

The system memory 1400 may store data that are used for an operation of the electronic device 1000. For example, the system memory 1400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The storage device 1500 may store data regardless of whether a power is supplied. For example, the storage device 1500 may include at least one of various nonvolatile memories such as a flash memory, a PRAM, an MRAM, a ReRAM, and a FRAM. For example, the storage device 1500 may include an embedded memory and/or a removable memory of the electronic device 1000.

The audio processor 1600 may process an audio signal by using an audio signal processor 1610. The audio processor 1600 may receive an audio input through a microphone 1620 or may provide an audio output through a speaker 1630.

The communication block 1700 may exchange signals with an external device/system through an antenna 1710. A transceiver 1720 and a modulator/demodulator (MODEM) 1730 of the communication block 1700 may process signals exchanged with the external device/system, based on at least one of various wireless communication protocols: long term evolution (LTE), worldwide interoperability for microwave access (WiMax), global system for mobile communication (GSM), code division multiple access (CDMA), Bluetooth, near field communication (NFC), wireless fidelity (Wi-Fi), and radio frequency identification (RFID).

The image processor 1800 may receive a light through a lens 1810. An image device 1820 and an image signal processor 1830 included in the image processor 1800 may generate image information about an external object, based on a received light.

The power management integrated circuit 1900 may be configured to receive a power from a battery or any other power source and to provide the power to the main processor 1100 or various other components. In an exemplary embodiment, the power management integrated circuit 1900 may include a voltage converter described with reference to FIGS. 1, 2, 3A to 3D, 4A to 4C, and 5 to 20. In an exemplary embodiment, each of various components of the electronic device 1000 may include a voltage converter described with reference to FIGS. 1, 2, 3A to 3D, 4A to 4C, and 5 to 20.

According to the inventive concept, a voltage converter may control a gate voltage depending on a drain-source voltage of a charging switch through which a charging current flows. In this case, even though the drain-source voltage increases, a magnitude of the charging current flowing through the charging switch may be controlled or limited by making the gate voltage relatively small. As the magnitude of the charging current is limited, elements in the voltage converter or an electronic device including the voltage converter may be prevented from being damaged. Accordingly, a voltage converter and a charging circuit that have improving reliability and stability are provided.

While the inventive concept has been described with reference to exemplary embodiments thereof, it will be apparent to those of ordinary skill in the art that various changes and modifications may be made thereto without departing from the spirit and scope of the invention as set forth in the following claims.

What is claimed is:

1. A voltage converter comprising:
    a charging circuit including a plurality of switches, and a first capacitor connected to a first node, and the charging circuit configured to receive an input voltage and output an output voltage based on the input voltage;
    a switch controller configured to:
    generate a plurality of switching signals based on the output voltage of the charging circuit and a reference voltage, and
    provide a first set of signals of the plurality of switching signals to the plurality of switches;
    a charging switch connected between the first node and a ground node, the charging switch including a first end connected to the first node and a second end connected to the ground node, and the charging switch configured to receive a gate voltage and turn on or turn off in response to the gate voltage; and
    a gate voltage controller configured to:
    receive a charging switching signal of the plurality of switching signals and a voltage of the first node, and
    generate the gate voltage based on the voltage of the first node and the charging switching signal,
    wherein the maximum level of the gate voltage is lower than the maximum level of the charging switching signal,
    wherein the gate voltage controller is configured to decrease the gate voltage as by increasing the voltage of the first node, wherein a magnitude of a charging current flowing through the charging switch is limited by decreasing the gate voltage,
    wherein the charging switching signal includes:
    an on-voltage having the input voltage or a power supply voltage and an off-voltage having a voltage of the ground node, or
    the on-voltage having the voltage of the ground node and the off-voltage having the input voltage or the power supply voltage,
    wherein the maximum level of the charging switching signal is the same as the input voltage or the power supply voltage,
    wherein the gate voltage controller includes:
    a compensation circuit configured to generate a compensation current based on the voltage of the first node and the gate voltage;
    a gate voltage generator configured to generate a pre-voltage based on the compensation current; and
    a voltage buffer configured to buffer the pre-voltage to output the gate voltage,
    wherein the compensation circuit includes:
    a tracking circuit configured to track the voltage of the first node; and
    a replica switch connected between the tracking circuit and the ground node and configured to generate the compensation current in response to the gate voltage,
    wherein the replica switch is a replica for the charging switch, and
    wherein the compensation current is 1/n times the charging current flowing through the charging switch, n being a positive integer.

2. The voltage converter of claim 1, wherein a first switch of the plurality of switches is connected between an input node configured to receive the input voltage and a second node,
    wherein a second switch of the plurality of switches is connected between the second node and an intermediate node,
    wherein a third switch of the plurality of switches is connected between the intermediate node and the first node,
    wherein a fourth switch of the plurality of switches is connected between the input node and the first node,
    wherein the first capacitor is connected between the second node and the first node, and
    wherein the charging switch is connected between the first node and the ground node.

3. The voltage converter of claim 2, wherein the charging circuit further includes:
    an inductor connected between the intermediate node and an output node configured to output the output voltage; and
    a second capacitor connected between the output node and the ground node.

4. The voltage converter of claim 1, wherein the gate voltage generator is configured to generate the pre-voltage based on the charging switching signal, and
    wherein the maximum level of the pre-voltage is lower than the maximum level of the charging switching signal.

5. The voltage converter of claim 4, wherein the gate voltage controller includes:
    a current source connected between a third node configured to receive the charging switching signal and a fourth node configured to output the pre-voltage; and a conversion transistor connected between the fourth node and the ground node and configured to turn on of turn off in response to the pre-voltage, and wherein the voltage buffer includes an amplifier including a non-inverting input terminal configured to receive the pre-voltage, an output terminal configured to output the gate voltage, and an inverting input terminal connected with the output terminal.

6. The voltage converter of claim 5, wherein the current source is a variable current source configured to operate in response to a control signal generated based on the voltage of the first node.

7. The voltage converter of claim 6, wherein, as the voltage of the first node increases, a current provided from the variable current source decreases.

8. The voltage converter of claim 1, wherein, as the compensation current increases, the gate voltage generator decreases the pre-voltage.

9. A voltage converter comprising:

a first switch connected between an input node configured to receive an input voltage and a second node;

a second switch connected between the second node and an intermediate node;

a third switch connected between the intermediate node and a first node;

a fourth switch connected between the first node and a ground node;

a fifth switch including a first end directly connected to the input node and a second end connected to the first node;

a first capacitor connected between the first node and the second node;

an inductor connected between the intermediate node and an output node for outputting an output voltage;

a second capacitor connected between the output node and the ground node;

a switch controller configured to generate first, second, third, fourth, and fifth switching signals based on a reference voltage and the output voltage of the voltage converter; and a gate voltage controller configured to generate a gate voltage based on the fourth switching signal and a voltage of the first node, wherein the first, second, third, and fifth switches are configured to turn on or turn off in response to the first, second, third, and fifth switching signals, respectively, and the fourth switch is configured to turn on or turn off in response to the gate voltage, wherein the maximum level of the gate voltage is lower than the maximum level of the fourth switching signal, wherein an end of each of the third switch and the fourth switch, and the second end of the fifth switch are connected in common, wherein the gate voltage controller is configured to decrease the gate voltage by increasing the voltage of the first node, wherein a magnitude of a charging current flowing through the fourth switch is limited by decreasing the gate voltage, wherein the gate voltage controller includes:

a current source connected between a node configured to receive the fourth switching signal and a pre-node;

a conversion transistor connected between the pre-node and the ground node and configured to turn on or turn off in response to a voltage of the pre-node;

a first amplifier including a first non-inverting input terminal connected to the pre-node, a first output terminal configured to output the gate voltage, and a first inverting input terminal connected to the first output terminal;

a tracking circuit connected between the pre-node and a tracking node and configured to track the voltage of the first node such that a voltage of the tracking node is identical to the voltage of the first node; and a replica switch connected between the tracking node and the ground node and configured to generate a compensation current in response to the gate voltage, wherein, as the voltage of the tracking node increases, the compensation current increases, and wherein the voltage of the pre-node corresponds to a bias current corresponding to a difference between a constant current from the current source and the compensation current.

10. The voltage converter of claim 9, wherein the tracking circuit includes:

a first transistor connected between the pre-node and a third node and configured to turn on or turn off in response to the gate voltage;

a second transistor connected between the third node and the tracking node;

a second amplifier including a second non-inverting input terminal, a second inverting input terminal, and a second output terminal;

a third capacitor connected between the second output terminal and the second inverting input terminal;

a fourth capacitor connected between the second non-inverting input terminal and the ground node;

a sixth switch connected between the first node and the second non-inverting input terminal;

a seventh switch connected between the second output terminal and a gate of the second transistor; and an eighth switch connected between the second inverting input terminal and the tracking node, wherein the sixth, seventh, and eighth switches are configured to turn on or turn off in response to the gate voltage.

11. A charging device comprising:

a charging circuit including a first capacitor connected to a first node, and the charging circuit configured to receive an input voltage and output an output voltage based on the input voltage;

a charging switch including a first end connected to the first node and a second end connected to a ground node, and the charging switch configured to receive a gate voltage and control a charging current flowing through the first capacitor and the charging switch in response to the gate voltage; and a gate voltage controller configured to generate the gate voltage based on a voltage of the first node, and the gate voltage controller including:

a current source connected between a first input terminal and a pre-node configured to output a pre-voltage;

a conversion transistor connected between the pre-node and the ground node and configured to turn on or turn off in response to a voltage of the pre-node;

a tracking circuit connected between the pre-node and a tracking node and configured to track the voltage of the first node;

a replica switch connected between the tracking node and the ground node and configured to turn on or turn off in response to the gate voltage; and a first amplifier including a first non-inverting input terminal configured to receive the pre-voltage, a first output terminal configured to output the gate voltage, and a first inverting input terminal connected to the first output terminal, wherein, as the voltage of the first node increases, the gate voltage controller decreases the gate voltage.

12. The charging device of claim 11, wherein the tracking circuit includes:

a first transistor connected between the pre-node and a second node and configured to turn on or turn off in response to the gate voltage;

a second transistor connected between the second node and the tracking node;

a second amplifier including a second non-inverting input terminal, a second inverting input terminal, and a second output terminal;

a second capacitor connected between the second output terminal and the second inverting input terminal;

a third capacitor connected between the second non-inverting input terminal and the ground node;

a first switch connected between the first node and the second non-inverting input terminal;

a second switch connected between the second output terminal and a gate of the second transistor; and a third switch connected between the second inverting input terminal and the tracking node, wherein the first, second, and third switches are configured to turn on or turn off in response to the gate voltage.

13. The charging device of claim 12, wherein the replica switch includes a third transistor connected between the tracking node and the ground node and configured to turn on or turn off in response to the gate voltage, and wherein a length of a channel of the third transistor is equal to a length of a channel of the charging switch, and a width of the channel of the third transistor is 1/n times a width of the channel of the charging switch, n being a positive integer.

14. The charging device of claim 11, wherein the charging circuit includes a buck-type DC voltage converter configured to operate in a buck mode, a boost-type DC voltage converter configured to operate in a boost mode, or a buck-boost-type DC voltage converter configured to operate in a buck-boost mode.

15. The charging device of claim 11, wherein the charging circuit is configured to charge an external battery.

\* \* \* \* \*